(12) United States Patent
Wagh et al.

(10) Patent No.: US 8,603,231 B2
(45) Date of Patent: Dec. 10, 2013

(54) PHOSPHATE BONDED COMPOSITES AND METHODS

(71) Applicant: Latitude 18, Inc., Marco Island, FL (US)

(72) Inventors: Arun S. Wagh, Naperville, IL (US); Sameerkumar Vasantlal Patel, Raleigh, NC (US); Anand Paul Mangalam, Carrollton, TX (US)

(73) Assignee: Latitude 18, Inc., Marco Island, FL (US)

( * ) Notice: Subject to any disclaimer, the term of this patent is extended or adjusted under 35 U.S.C. 154(b) by 0 days.

(21) Appl. No.: 13/680,685

(22) Filed: Nov. 19, 2012

(65) Prior Publication Data

US 2013/0078479 A1    Mar. 28, 2013

Related U.S. Application Data

(62) Division of application No. 13/023,795, filed on Feb. 9, 2011.

(60) Provisional application No. 61/302,757, filed on Feb. 9, 2010.

(51) Int. Cl.
*C09D 5/18* (2006.01)
*C04B 12/02* (2006.01)
*C04B 12/04* (2006.01)

(52) U.S. Cl.
USPC ............. 106/18.14; 106/18.31; 106/164.5; 106/690; 162/159; 427/372.2; 428/541

(58) Field of Classification Search
None
See application file for complete search history.

(56) References Cited

U.S. PATENT DOCUMENTS

| | | | |
|---|---|---|---|
| 4,399,046 A | 8/1983 | Okamura | |
| 4,569,878 A | 2/1986 | Barrall | |
| 4,661,398 A | 4/1987 | Ellis | |
| 4,981,518 A | 1/1991 | Sachs | |
| 2003/0092554 A1* | 5/2003 | Wagh et al. | 501/1 |
| 2005/0229809 A1* | 10/2005 | Lally | 106/18.14 |
| 2007/0017418 A1* | 1/2007 | Dennis | 106/685 |
| 2007/0267120 A1* | 11/2007 | Feigin et al. | 156/45 |
| 2008/0171179 A1 | 7/2008 | Surface | |
| 2008/0257222 A1* | 10/2008 | Wallner | 106/689 |

OTHER PUBLICATIONS

KIPO, PCT International Search Report dated Feb. 9, 2010.

* cited by examiner

*Primary Examiner* — Mary F Theisen
(74) *Attorney, Agent, or Firm* — Christopher J. Knors; Moore & Van Allen PLLC

(57) ABSTRACT

Inorganic-organic composite articles and methods for producing them using inorganic acidic/alkaline precursor components as inorganic adhesives is provided. Articles prepared therefrom provide improved flexibility, zero flame spread, no release of volatile organic compounds, and low carbon foot print.

42 Claims, 10 Drawing Sheets

PHOSPHATE BONDED COMPOSITES AND METHODS

CROSS-REFERENCE TO RELATED APPLICATIONS

This application is a divisional of U.S. patent application Ser. No. 13/023,795, filed on Feb. 9, 2011, entitled "PHOSPHATE BONDED COMPOSITES AND METHODS", which claims the benefit of Provisional Patent Application No. 61/302,757, filed on Feb. 9, 2010, all of which are hereby incorporated by reference herein in their entirety.

TECHNICAL FIELD

This disclosure relates generally to inorganic-organic composite articles and methods for their fabrication. Specifically, the articles and methods comprise inorganic acidic/alkaline precursor components as adhesives that set into an inorganic binder together with organic material.

BACKGROUND

Acid-base cements (ABCs) are formed by reaction of a mild acid with a suitable base. The most common examples of inorganic acid-base cements are phosphate cements, oxychloride and oxy-sulfate cements. Among these, phosphate cements have been researched the most and several products have been developed that range from dental cements, ceramics for stabilization of radioactive and hazardous waste streams, specialty cements for oil field applications, resins for paints and coatings and adhesives, road patching materials and many more. Among these, few have been commercialized.

There have been attempts to use inorganic cementatious binders for producing natural fiber composites. For example, use of thin pastes of Portland cement or calcium aluminate cement has been reported as an adhesive. However, these cementatious binders are extremely alkaline, and the paste prepared from these materials is very thick and cannot effectively impregnate the cells and capillaries of the cellulosic structure of the wood/fiber and likely cure prior to impregnating the fiber. As a result, the loading of these cementatious binders in the fibers is very low. Therefore, fiber content essentially improves the properties of the cement, rather than the cement being used as an adhesive to load large amount of fiber.

Other previously reported inorganic composites comprise the reaction product of phosphoric acid and a silicate or aluminate of calcium, magnesium, or zirconium and are used with various fillers to produce a gypsum-board-like core that is wrapped in recycled paper. This method of producing wall boards and other similar products has several drawbacks. Namely, the use of phosphoric acid solution at very low pH leads to corrosion of equipment and handling problems. This is especially true when the products are produced in large scale. This approach also uses sparsely soluble, powdered precursor components. Calcium silicate or other silicates or aluminates, being slightly soluble at ambient temperature do not completely react, resulting in most of the silicate remaining un-reacted in the composite product as particulate matter. Thus, the wall board produced by this previously reported method is essentially a composite of cellulose, cement, and variable amounts of un-reacted precursor powder. This incomplete reaction produces composite products with low performance attributes than is expected. While the previously reported method may be adequate for production of gypsum-like boards that exhibits low mechanical performance, it is not suitable for production of high quality and versatile fiber reinforced composites.

Moreover, the inorganic acid component of the previously reported methods is limited to phosphoric acid as the only effective acid-phosphate for the reaction employing a silicate precursor. It is generally known that it is difficult to react acid phosphates (such as sodium and potassium dihydrogen phosphate, $NaH_2PO_4$ and $KH_2PO_4$ respectively) and also alkaline phosphates (such as dipotassium phosphate, $K_2HPO_4$), with silicates and aluminates at room temperature, and it is difficult or impossible to work with alkaline phosphates for producing binders. Thus, it is unlikely that previously reported processes will work with any acid phosphate other than phosphoric acid. The above previously disclosed processes mention products (mainly wall boards) with silicates and aluminates, however, they do not mention such products having high loadings of cellulose.

Likewise, it has been reported using Ceramicrete technology for producing cellulosic composites, in which calcined magnesium oxide is reacted with mono potassium phosphate to produce a matrix, in which cellulose forms the reinforcing material. Thus, using Ceramicrete technology for producing cellulosic composites is similar to previously disclosed methods above, where the cementatious material is reinforced by cellulose fibers, and as a result, the loading of the fibers is low.

Methods of mixing solid calcined oxide or calcined minerals (e.g., calcium silicate) with inorganic acidic component precursor solution together with fiber in one step is not efficient, and presents technical and manufacturing problems of providing reproducible pulp affecting reproducibility of article formation. It is believed that because of the rapid acid-base reaction between the inorganic acidic component and the solid or calcined alkaline oxide component, there is insufficient time for the fibers to mix and to wet out.

SUMMARY

The methods, compositions and products discussed in the present application are intended to produce products with high loadings of cellulosic material and very low loading of the inorganic binder, and thus the materials, methods, and products disclosed and described herein are distinctively different from that previously reported and discussed above.

Disclosed and described herein are products and methods for producing composites from naturally available fibrous material combined with inorganic acidic/alkaline adhesives suitable for providing composites having inorganic binders. Thus, in one aspect, an organic-inorganic composite material can be manufactured. The inorganic acidic/alkaline components can replace conventional organic adhesives currently used in commercially available composite products. The resulting composites comprising inorganic binders exhibit improved properties over organic-based adhesives, such as, zero flame spread and/or reduced or zero volatile organic compounds (VOCs) emission during their fabrication or use or exposure to heat. The resulting composites comprising the presently disclosed inorganic binders can be cured at lower temperatures compared to commercially available composite materials. These features provide significant savings on energy consumption during production of these products, and a very low carbon foot print. Thus, in a first embodiment, a method of producing a composite product is provided. The method comprising providing a organic material, and contacting the organic material with an inorganic adhesive, the inorganic adhesive comprising a mixture of an inorganic acidic precursor and an alkaline precursor.

In a first aspect of the first embodiment, the weight ratio of the organic material to the total inorganic adhesive, excluding water content, is between about 99:1 to about 2:1, preferably about 10:1 to about 5:1, and more preferably about 7:1. In a second aspect of the first embodiment, the organic material comprises at least one of wood veneer, short and long flakes, long fiber, short fiber, strands, saw dust, wood particles, fiber bundles, stone groundwood (SGW), pressure groundwood (PSW), refiner mechanical pulp (RMP), thermomechanical pulp (TMP), chemithermomechanical pulp (CTMP), kraft pulp, sulfite pulp, soda pulp, bleached pulp, seed fibers, leaf fibers, bast fibers, fruit fibers, stalk fibers, silk, wool, spider silk, and mixtures thereof.

In a third aspect of the first embodiment, the inorganic acidic precursor and the alkaline precursor are, independently, in solution, suspension, gel, or as paste.

In a forth aspect of the first embodiment, the alkaline precursor is present in solution.

In a fifth aspect of the first embodiment, the contacting step comprises contacting the organic material with the alkaline precursor solution first, and then is contacted with the inorganic acidic precursor solution, or contacting the organic material with the inorganic acidic precursor followed by contact with the alkaline precursor; or contacting the organic material with the inorganic adhesive.

In a sixth aspect of the first embodiment, the inorganic acidic precursor and the alkaline precursor are each mixed separately with the organic material, to form, independently, separate acidic fiber pulp or fiber, and separate alkaline pulp or fiber.

In a seventh aspect of the first embodiment, the method further comprises combining the separate acidic and alkaline pulps or fibers, mixing with sufficient amount of water; and forming a solid composite product.

In an eighth aspect of the first embodiment, the method further comprises drying the separate acidic and alkaline pulps, combining the dried acidic and alkaline pulps or fibers, mixing the combined dried acidic and alkaline pulps or fibers with water; and forming a solid composite product.

In combination with any one of previous aspects of the first embodiment, the alkaline precursor component comprises at least one of an alkaline oxide, hydroxide, or an oxide mineral.

In combination with any one of previous aspects of the first embodiment, the inorganic acidic precursor component comprises at least one of an acid-phosphate, a chloride, or a sulfate.

In combination with any one of previous aspects of the first embodiment, the alkaline precursor comprises at least one of a saturated solution or a paste of at least one of a monovalent-, divalent-, or trivalent metal oxide or hydroxide of magnesium, calcium, iron, manganese, zinc, barium, strontium, aluminum, lanthanide, or mixtures thereof.

In combination with any one of previous aspects of the first embodiment, the alkaline precursor is a solution of a metal hydroxide rich brine, such as, for example, the brine is magnesium hydroxide brine solution, or pregnant Bayer liquor of aluminum hydroxide.

In combination with any one of previous aspects of the first embodiment, the method further comprises the addition of an appropriate amount of highly alkaline solution of alkaline metal hydroxide to raise the aqueous pH of the alkaline precursor, such as an alkaline metal hydroxide selected from sodium hydroxide (NaOH), potassium hydroxide (KOH), ammonium hydroxide ($NH_4OH$), or calcium hydroxide ($Ca(OH)_2$).

In combination with any one of previous aspects of the first embodiment, wherein the aqueous pH of the alkaline precursor is between about 8 to about 14, preferably between about 9 to about 12, and most preferably between about 10 to about 11.

In combination with any one of previous aspects of the first embodiment, wherein the inorganic acidic component comprises at least one of a saturated solution of phosphoric acid, or an acid phosphate salt comprising sodium dihydrogen phosphate ($NaH_2PO_4$), potassium dihydrogen phosphate ($KH_2PO_4$), cesium dihydrogen phosphate ($CsH_2PO_4$), magnesium dihydrogen phosphate ($Mg(H_2PO_4)_2.2H_2O$), calcium dihydrogen phosphate ($Ca(H_2PO_4)_2.2H_2O$), zinc dihydrogen phosphate ($Zn(H_2PO_4)_2$), mono aluminum hydro phosphate ($AlH_3(PO_4)_2.H_2O$), $MgCl_2$, $MgSO_4$, and mixtures thereof.

In combination with any one of previous aspects of the first embodiment, the method further comprises adjusting the solution pH of the inorganic acidic component to between about 0 to about 6, preferably between about 3 to about 5, and most preferably between about 3 to about 4.5. The pH can be reduced by adding two or more hydrophosphates.

In combination with any one of previous aspects of the first embodiment, the method further comprises adding at least one of oxide minerals comprising sparsely soluble silicates, calcium silicate (wollastonite, $CaSiO_3$), mullite, talc, oxide minerals, fly ash, bottom ash, Bayer process waste, acidic waste streams generated during extraction of copper from copper ore, or waste streams containing silicate and aluminate minerals, and mixtures thereof.

In another aspect of the first embodiment, the alkaline component is magnesium oxide, and the inorganic acidic component precursor is selected from magnesium chloride or magnesium sulfate solution.

In combination with any one of previous aspects of the first embodiment, the method further comprises heating at least one of the inorganic acidic precursor component or alkaline precursor component to temperature less than the boiling point of water prior to contacting with the cellulose.

In another aspect of the first embodiment, the inorganic acidic component is aluminum hydrophosphate and the alkaline component is aluminum oxide ($Al_2O_3$) or aluminum hydroxide ($Al(OH)_3$), such as for example, where the aluminum hydrophosphate and the alkaline component are mixed to form a paste that is then mixed with cellulose. The method can further comprise heating the paste mixed with cellulose about 400° F. for a time sufficient to form a composite article.

In combination with any one of previous aspects of the first embodiment, the method further comprises compressing the organic material, and/or applying vacuum and/or applying sonication.

In combination with any one of previous aspects of the first embodiment, the weight ratio of the inorganic acidic precursor and alkaline precursor is between 10:1 and 1:5, preferably between about 9:1 and 1:3.5, and more preferably between about 8:1 to about 1:3.5. The method can further comprise withholding a portion of the inorganic adhesive prior to compressing and then adding the remaining portion of the inorganic adhesive at a time approximate to the end of compressing.

In combination with any one of previous aspects of the first embodiment, the method further comprises mixing the organic material and inorganic adhesive and applying heat to the composite samples to raise the temperature of the composite to <400° F.

In a second embodiment, a method of producing a fiber reinforced ceramic composite is provided. The method comprises providing an inorganic phosphate adhesive comprising a mixture of an inorganic acidic precursor and an alkaline precursor, wherein the alkaline precursor is in solution; providing less than about 40 wt. % cellulosic material; and contacting he cellulosic with the material inorganic phosphate adhesive.

In a first aspect of the second embodiment, the cellulosic material comprises at least one of wood veneer, short and long flakes, strands, saw dust, wood particles, fiber bundles, and/or products obtained by pulping, stone groundwood (SGW), pressure groundwood (PSW), refiner mechanical pulp (RMP), thermomechanical pulp (TMP), chemithermomechanical pulp (CTMP), kraft pulp, sulfite pulp, soda pulp, bleached pulp, seed fibers, leaf fibers, bast fibers, fruit fibers, stalk fibers, and mixtures thereof.

In combination with any one of previous aspects of the second embodiment, contacting the cellulosic material with the alkaline precursor solution first, and then contacting with the inorganic acidic precursor, or contacting the cellulosic material with the inorganic acidic precursor followed by contacting the alkaline precursor solution, or contacting the cellulosic material with the inorganic adhesive.

In combination with any one of previous aspects of the second embodiment, the inorganic adhesive is at least one of phosphate ceramic, an oxychloride ceramic, an oxysulfate ceramic, and mixture thereof.

In combination with any one of previous aspects of the second embodiment, the inorganic phosphate adhesive comprises a divalent- or tri-valent metal, or their silicates.

In combination with any one of previous aspects of the second embodiment, the method further comprises adding at least one of calcium silicate (wollastonite, $CaSiO_3$), olivine, mullite, talc, oxide minerals, fly ash, bottom ash, Bayer process waste, acidic waste streams generated during extraction of copper from copper ore, or waste streams containing silicate and aluminate minerals, and mixtures thereof.

In combination with any one of previous aspects of the second embodiment, the method further comprises injection molding or extruding the inorganic adhesive and the cellulosic material, which can further comprise applying vacuum or applying sonication.

In combination with any one of previous aspects of the second embodiment, the method further comprises heating at least one of the inorganic acidic precursor component or alkaline precursor component to temperature less than the boiling point of water prior to contacting with the cellulose.

In combination with any one of previous aspects of the second embodiment, wherein the fiber reinforced composite provides fire resistance, zero flame spread, minimum release of green house gases, no release of volatile organic compounds, and low water absorption.

In a third embodiment, a method of producing non-flammable blowable insulation is provided. The method comprises providing a blowable material comprising at least one of shredded paper, saw dust, wood shavings, shredded plastics, glass particles or glass fibers; gypsum, expandable clays, and mixtures thereof. Providing an inorganic adhesive, the inorganic adhesive comprising (i) an inorganic acidic component comprising at least one of a saturated solution of phosphoric acid, sodium dihydrogen phosphate ($NaH_2PO_4$), potassium dihydrogen phosphate ($KH_2PO_4$), cesium dihydrogen phosphate ($CsH_2PO_4$), magnesium dihydrogen phosphate ($Mg(H_2PO_4)_2.2H_2O$), calcium dihydrogen phosphate ($Ca(H_2PO_4)_2.2H_2O$), zinc dihydrogen phosphate ($Zn(H_2PO_4)_2$), $MgCl_2$, $MgSO_4$, mono aluminum hydro phosphate ($AlH_3(PO_4)_2.H_2O$), and mixtures thereof; and (ii) an alkaline precursor comprising a saturated solution or a paste of at least one of a monovalent-, divalent-, or trivalent metal oxide or hydroxide of magnesium, calcium, iron, manganese, zinc, barium, strontium, aluminum, lanthanide, or mixture thereof, and contacting the blowable material with the inorganic adhesive for a sufficient time to bond the inorganic adhesive with the blowable material.

In a fourth embodiment, a method of producing zero flame spread articles is provided. The method comprises providing a combustible material and introducing a coating of inorganic adhesive to at least a portion of the combustible material; the inorganic adhesive comprising a mixture of at least one of a phosphate ceramic, an oxychloride ceramic, an oxysulfate ceramic, a divalent- or tri-valent metal oxides or their silicates, and mixtures thereof; and at least one of calcium silicate (wollastonite, $CaSiO_3$), olivine, mullite, talc, oxide minerals, fly ash, bottom ash, Bayer process waste, acidic waste streams generated during extraction of copper from copper ore, or waste streams containing silicate and aluminate minerals, and mixtures thereof; and at least one alkaline precursor component comprising a saturated solution or a paste of at least one of a monovalent-divalent-, or trivalent metal oxide or hydroxide of magnesium, calcium, iron, manganese, zinc, barium, strontium, aluminum, lanthanide, and mixtures thereof.

In a first aspect of the fourth embodiment, the combustible article is a wall board or ceiling tile, or comprises a stretched woven mat of cellulosic fiber.

In any one of previous aspects of the above embodiments the combustible article comprises a stretched woven mat of cellulosic fiber or a plurality of stacked thin sheets of wood, each sheet of wood being bonded by the inorganic adhesive, whereby a veneered sheet product is obtained.

In a fifth embodiment, a method of producing fire resistant paper and paper products is provided. The method comprises providing a cellulosic material, providing an inorganic adhesive precursor comprising (i) an inorganic phosphate solution comprising at least one of a saturated solution of phosphoric acid, or an acid phosphate salt comprising sodium dihydrogen phosphate ($NaH_2PO_4$), potassium dihydrogen phosphate ($KH_2PO_4$), cesium dihydrogen phosphate ($CsH_2PO_4$), magnesium dihydrogen phosphate ($Mg(H_2PO_4)_2.2H_2O$), calcium dihydrogen phosphate ($Ca(H_2PO_4)_2.2H_2O$), zinc dihydrogen phosphate ($Zn(H_2PO_4)_2$), $MgCl_2$, $MgSO_4$, mono aluminum hydro phosphate ($AlH_3(PO_4)_2.H_2O$); and mixtures thereof, and (ii) an alkaline precursor solution comprising at least one of a saturated solution or a paste of at least one of a monovalent-divalent-, or trivalent metal oxide or hydroxide of magnesium, calcium, iron, manganese, zinc, barium, strontium, aluminum or lanthanide, and mixtures thereof. A paste of the cellulosic material and the inorganic adhesive is provided. Optionally, the method comprises drying the paste and providing a fiber mat of a thickness suitable for use as paper. The dry weight ratio of cellulosic material to inorganic adhesive can be between about 1 wt. % to about 20 wt. %, such that the paper or paper products exhibit fire resistance and/or zero flame spread.

In a first aspect of the fifth embodiment, the method the method further comprises at least one of calcium silicate (wollastonite, $CaSiO_3$), olivine, mullite, talc, oxide minerals, fly ash, bottom ash, waste streams containing silicate and aluminate minerals, and mixtures thereof. The method provides flame resistant paper material or paper articles and/or nonflammable home and commercial building wrap or wall paper.

In a sixth embodiment a method of treating wood to produce zero flame spread wooden article is provided. The method comprises contacting a wood article with a composition comprising (i) at least one of a saturated solution of phosphoric acid, or an acid phosphate salt comprising sodium dihydrogen phosphate ($NaH_2PO_4$), potassium dihydrogen phosphate (KH$_2$PO$_4$), cesium dihydrogen phosphate (CsH$_2$PO$_4$), magnesium dihydrogen phosphate (Mg(H$_2$PO$_4$)$_2$.2H$_2$O), calcium dihydrogen phosphate (Ca(H$_2$PO$_4$)$_2$.2H$_2$O), zinc dihydrogen phosphate (Zn(H$_2$PO$_4$)$_2$), MgCl$_2$, MgSO$_4$, mono aluminum hydro phosphate (AlH$_3$(PO$_4$)$_2$.H$_2$O), and mixtures thereof; and (ii) an alkaline precursor solution of one or more of a saturated solution or a paste of at least one of a monovalent-divalent-, or trivalent metal oxide or hydroxide of magnesium, calcium, iron, manganese, zinc, barium, strontium, aluminum, lanthanide, and mixtures thereof. Optionally, at least one of calcium silicate (wollastonite, CaSiO$_3$), olivine, mullite, talc, oxide minerals, fly ash, bottom ash, Bayer process waste, acidic waste streams generated during extraction of copper from copper ore, or waste streams containing silicate and aluminate minerals, and mixtures thereof is added. The wood article contacted by the composition is dried.

A zero fire spread wood article produced by the sixth embodiment is provided.

A composite article produced from any one of previous aspects of the above embodiments is also provided.

DETAILED DESCRIPTION

Figure 1:
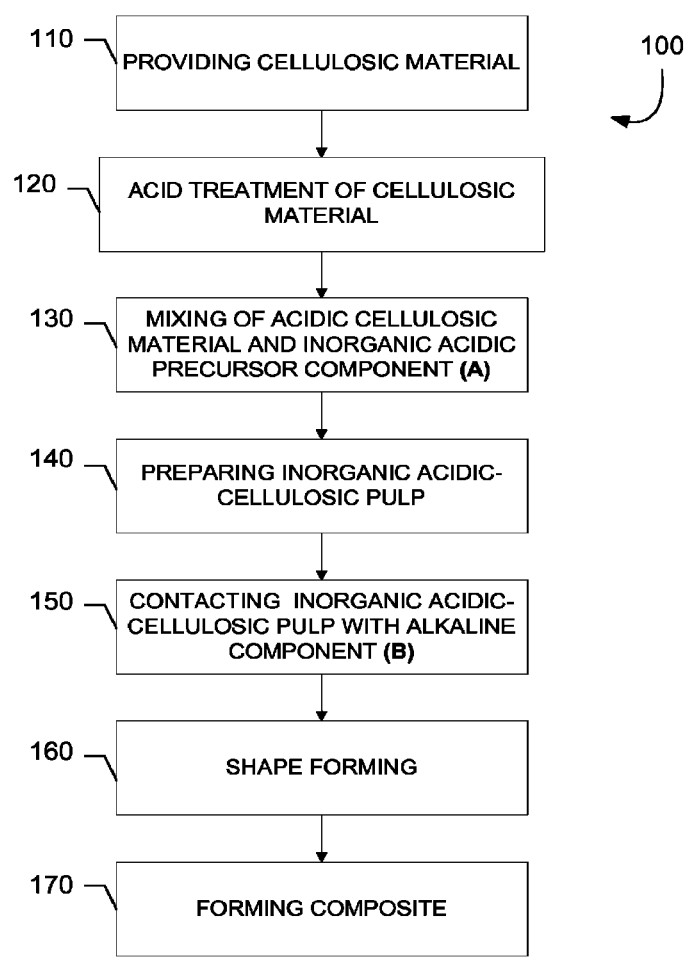
FIG. 1 depicts a first aspect of preparing an inorganic fiber composite as disclosed and described.

In general, methods of binding organic materials, such as naturally available fibrous materials such as ligno-cellulosic materials derived from wood and plants, using inorganic phosphoric acid-base binders are disclosed and described. Composite articles comprising fiber bound with an inorganic acid-base binder is also disclosed and described. In at least one aspect, aqueous solutions of precursors of an inorganic acidic component and an alkaline component are employed as the inorganic phosphoric acid-base adhesive for providing a binder for an inorganic cellulosic composite article, further described herein.

Disclosed and described herein are inorganic adhesives produced by acid-base reactions of their respective acidic/akaline precursors, and novel cellulosic material composites prepared therefrom. These inorganic adhesives comprise, in part, but are not limited to, phosphate, oxy-chloride, and oxy-sulfate precursors. The resulting composite products comprising the inorganic binders disclosed herein are distinctly different from composites formed from organic binders. The inorganic cellulose composites exhibit distinctive properties, such as, lightweight, fire retardancy, and high ductility.

Acid-base adhesives are formed by acid-base reaction of an oxide or hydroxide as an alkaline component, and an acid-phosphate or a metal chloride or metal sulfate as inorganic acidic component. The reaction in presence of water produces acid-base adhesive that has the ability to bind cellulose and/or fill the cell lumens in cellulosic materials and provide a solid structure to the composite. It is generally believed that because the cell lumen are very small, capillary action is required for the binder components to enter the vacant space. Capillary action is facilitated by the disclosed precursor components in that they can be provided dilute and with low viscosity.

Cellobiose, a repeating unit of cellulose, contains six hydroxyl groups. The degree of polymerization (total no. of repeating units in a single chain of polymer) of cellulose can be up to approximately 1500. These repeat units of cellulose are bonded by large number of intra and inter hydrogen bonds within a chain and between chains. While not to be bound by any theory, it is believed that using aqueous acid-base adhesive enhances this hydrogen bonding and produce composites. Typically, a conventional organic adhesive is designed to interact with hydroxyl groups of the cellulose by producing ether, ester, or new hydrogen bonds. For example, phenol formaldehyde, and other polyol based adhesives are primarily used in wood composites due to their ability to form polymeric network that interconnects microporous wood surfaces. It is believed that a similar bonding mechanism is likely when using the aqueous inorganic acidic/alkaline precursor adhesives.

Commonly used organic adhesives for wood composites are formaldehyde based, for example, phenol formaldehyde, resorcinol formaldehyde, or a combination of phenol-resorcinol formaldehyde, urea formaldehyde, mixed urea formaldehyde, or melamine formaldehyde. Other commonly used adhesives include urethane based organic polymers, isocyanates, epoxy, polyvinyl and ethylene vinyl acetate dispersion adhesives. All of the organic-based adhesives produce not only volatile organic compounds, but also bear an enormous carbon footprint. Approximately 1.25 to 1.5 ton per ton of greenhouse gases are produced per ton of polymer. In contrast, the inorganic phosphate based adhesives do not produce any volatile organic compounds and generate only about 0.2-0.25 ton of greenhouse gases per ton of the adhesive, which is approximately one fifth to one sixth that of organic polymer adhesives.

Another advantage of using the inorganic adhesives disclosed and described herein is the ability to prepare fiber-based composites without drying the fiber. When organic polymers adhesives are used, the wood/fiber has to be dried sufficiently for proper wetting of the adhesive on the fiber surface as well to avoid moisture entrapment on the resin/fiber interface. The weight of water in the wood/fiber can be as much as the weight of the dry wood by itself and drying therefore has an energy penalty. In addition, drying the wood/fiber also releases volatile organic compounds (VOCs) such as terpenes. In contrast, the presently disclosed processes using inorganic acidic/alkaline precursor adhesives does not require dry fiber to initiate proper wetting or formation of binder. In fact, the presently disclosed inorganic acidic/alkaline precursor adhesives can be aqueous solutions. Free water present in the wood fibers will squeeze out while pressing, and hence will result in maximum dissolution of components of adhesives (acidic as well as alkaline) that facilitates faster reaction and thereby shorten the curing time. The same inorganic binder system might also trap VOC in the resultant composite, such as terpenes.

Cellulosic Materials

Any cellulosic material can be used in providing the inorganic acid-base fiber composites or fiber reinforced ceramics, and in carrying out the methods disclosed and described herein. Ligno-cellulosic materials can be obtained in various forms that include, but not limited to, hardwood and softwood fibers obtained from wood or plant materials. The fibrous materials can be wood veneer, short and long flakes, strands, saw dust, wood particles, fiber bundles, and/or raw material obtained by different pulping methods such as, stone ground wood (SGW), pressure ground wood (PSW), refiner mechanical pulp (RMP), thermo mechanical pulp (TMP), chemi-thermo-mechanical pulp (CTMP), Kraft pulp, soda pulp, recycled pulp, and bleached pulp. Fibrous materials also include different plant fibers such as corn silk, seed fibers, leaf fibers, bast (skin) fibers, fruit fibers, and stalk fibers. Cellulosic materials are inclusive of thin sheets of wood or pressed wood forms, for example, veneers and the like. In addition to the above examples, cellulosic materials also encompass a non-cellulosic based material, for example, other biomaterials such as wool, silk, and spider silk. Cellulosic materials are inclusive of long fibers and short fibers. These exemplary examples of raw materials are referred to hereafter without any limitations as "ligno-cellulosic materials" or, interchangeably as "cellulosic materials."

Naturally available cellulosic materials suitable for development of composites with cellulosic materials consist of lignin, hemi-cellulose, cellulose, and extractives. The methods disclosed and described herein are applicable to these cellulosic materials with and without some treatment to remove all or part of lignin, hemi-cellulose, and extractives, though removal of some hemi-cellulose generally provides better product. Removal of lignin and hemi-cellulose involves well known Kraft or soda pulping process, i.e., boiling the cellulosic material in alkaline solution in which some of the lignin and hemi-celluloses will be extracted using boiling alkali. In at least one aspect of the presently disclosed methods, the removed lignin and hemi-celluloses material are then replaced by the inorganic adhesives during formation of the composite. In addition to replacing removed materials, the adhesives also bind the cellulose and remaining components and form the composites.

Inorganic Acidic/Alkaline Adhesive Compositions

In at least one aspect, the inorganic acidic precursor and the alkaline precursor components function as an adhesive for the composite and becomes an inorganic binder for the composite upon setting. The binder precursor compositions include, but are not limited to, all different forms of acid-base combinations such as phosphate binders, oxy-chloride and oxy-sulfate ceramics. In particular, disclosed herein are phosphate acidic precursor/alkaline precursor components in detail, but the methods disclosed and described herein are generally applicable for other binders and hence all acid-base binders are envisaged.

The methods of using aqueous solutions and producing inorganic acid-base adhesives disclosed and described herein are distinctively different from earlier reported phosphate bonded structural products in which sparingly soluble metal oxides in powder form are reacted with phosphoric acid solution to produce cementatious binders. These previously reported methods involve cementatious binder containing solid powders as the metal oxide, being sparingly soluble, does not completely react with the phosphoric acid component precursor or provides a core-shell morphology in the finished article where discrete metal oxide particles remain in the composite product. This incomplete reaction of the alkaline component when powder metal oxide is used produces products that are inferior in quality and performance as compared to the in-solution alkaline component precursor disclosed and described herein.

Further, in contrast to previously reported inorganic cementatious processes, using powder metal oxides and typically calcined oxides, is that calcination of metal oxides is an energy intensive process and adds to the carbon footprint of the overall process. The previously reported processes have limitations that make large scale manufacturing problematic, for example, during production of cementatious bound fiber composites, both the (calcinide) oxide and phosphoric acid need to be mixed with the fiber at essentially the same time. Because the setting reaction is rapid for inorganic cementatious processes using powder metal oxides, this leaves very little time for fiber to mix with and/or react with the calcined oxide, for the fiber to be impregnated, and for the fiber to be effectively coated. Generally, this results in an inferior fiber composite relative to the processes disclosed and described herein. Moreover, the loading of fiber is reduced when using calcined metal oxides with inorganic acidic components, resulting in a composite material in which cellulosic material is reinforcing a cement, in contrast to the presently disclosed methods and articles where the inorganic binder reinforces the cellulosic material.

Disclosed herein are processes of using suitable solutions of uncalcined metal hydroxides and acid-phosphates to develop adhesives that provide inorganic binder for cellulosic fiber composites. The advantages of these disclosed processes over previously reported cementatious fiber composite forming methods and the resultant articles are several. For example, uncalcined metal hydroxide has higher solubility compared to the calcined oxides or minerals (e.g., calcium silicate). As a result, the yield of the inorganic acidic/alkaline reaction product using uncalcined metal hydroxide as the adhesive is increased, and consequently, less total inorganic acidic/alkaline binder is needed. Sourcing uncalcined hydroxide for the alkaline component precursor, for example, magnesium hydroxide brine extracted and derived from dolomite mines, eliminates physical separation of magnesium hydroxide from solution, saves on energy, and further reduces carbon footprint. Using less acidic acid-phosphates avoids handling strong acids and subsequent corrosion of the manufacturing equipment, disposal of strong acid waste, and residual oxides present in or on the articles produced.

It has been advantageously found that with the use of slower reacting acid-phosphate solutions as the inorganic acidic component precursor and solutions of oxide or hydroxide or oxide mineral as the alkaline component for the inorganic adhesive, improved cellulosic composites are provided. The presently disclosed methods provide for essentially complete wetting of the cellulosic material fibers upon contact, and as a result, superior binding of fibers with the inorganic acidic/alkaline adhesive occurs, resulting in composite articles possessing superior properties compared to cellulosic composites comprising cementatious binders.

The above attributes, alone or in combination, will provide for the production of a range of products that cannot otherwise be produced by previously disclosed methods employing solid metal oxide or calcined metal oxide/minerals as the alkaline component precursor. For example, and without any implications of limitations, composite articles produced by the presently disclosed methods provide for products with very high loading of cellulose with minimum amounts of adhesive/binder that otherwise cannot be produced by the previously reported cementatious methods.

Moreover, the presently disclosed methods and materials that comprise a mixture of cellulose and the inorganic acidic/alkaline component solutions (e.g., pulp containing same), can be extruded easily without the presence of abrasive particulate matter. Low viscosity inorganic acidic/alkaline component solutions disclosed and described herein can be infused/injected between cellulosic fiber mats and weaves of individual fiber mats providing improved fiber matrix composites of high performance. In contrast, solid particulate matter normally present in binder compositions previously reported will clog the porous spaces between the mat layers/fibers or weave, hindering or forbidding infusion/injection processing.

Solution viscosities of the presently disclosed alkaline precursor are lower than in the previously reported composite forming methods. As a result, pumping and injecting these solutions is facilitated and provides for greater impregnation of the inorganic binder components in the fibers providing superior composite articles.

In one aspect, both acidic and alkaline components are first dissolved or provided in aqueous media, preferably to their optimum solubility, and their liquid fractions contacted with cellulosic material, for example, using standard composite processes. Contacting can include injecting and other processes intended to distribute the precursors within and throughout the cellulosic material. In other aspects, at least one or both of the acidic and alkaline components are heated prior to contact with the cellulosic material. The acidic and alkaline components can be heated to a temperature at or near the boiling point of water. In one specific aspect, at least one or both of the acidic and alkaline components are heated up to about the boiling point of water before contact with the cellulosic material.

After introducing the inorganic acidic and the alkaline precursor solutions to the cellulosic materials, an acid-base reaction generally occurs as well as possible reaction of the precursor materials alone or in combination with various functional groups of the cellulosic material. These reactions can occur on the wetted surfaces of the cellulose, binding the cellulosic fiber to each other. After contacting the acidic and alkaline components with the cellulosic materials, additional heating can be used, for example, heating up to about 400° F. can be used to accelerate curing of the inorganic binder. Heating can be carried out in combination with other processes that aid in the distribution of the acidic and alkaline components within the cellulosic materials, such as pressure, vacuum and/or sonication.

In specific embodiments, use of sonic mixers and/or vacuum chamber to impregnate acidic/alkaline components in the fiber cells, thereby introducing only the amount of solution that is needed and thus reducing use of excess adhesive solution or water are provided. In certain aspects, the methods disclosed and described herein are specific to the precursor acid/base solutions employed, and therefore, one or more processing techniques can be tailored to specific acid/base solutions. In various aspects, these specific compositions and corresponding processing techniques are provided.

The excess water present in the combination of both acidic and alkaline components may also wet the fiber well, an advantage that is not available in previously disclosed processes. This excess water may be removed by applying pressure on the wet composite material followed by heat treatment or by applying heat and pressure simultaneously.

In contrast to conventional acid-base cementatious materials, such as Ceramicrete, concentrated aqueous solutions, as disclosed herein, contain a stoichiometric excess of water, and hence the inorganic adhesive can be prevented from setting quickly (and the composite does not solidify) until essentially all of the stoichiometric excess water is removed. This improvement provides advantages for composite fabrication processes not otherwise possible using previously reported cements with fibers.

Fiber Reinforced Ceramic Composites

Cellulosic fiber reinforced ceramic composites are generally understood as articles prepared with acid-base precursors in an amount in excess to that of the cellulosic material, for example, less than about 35-40 wt % fiber. In this case, smaller amount of cellulosic material is mixed with one or both of the acid-base precursors powders/pastes to form pulp, which is then shaped by pressing. The resulting product is a hard and dense ceramic with the cellulosic material acting as reinforcement. Due to the low density of the cellulose and its fibrous properties, the resulting product is lighter than the original ceramic, and possess superior fracture toughness, as well as flexural properties than that of brittle ceramic without cellulosic material. The lightness and higher flexural strength also impart good impact resistance to the product. In at least one aspect, disclosed and described herein are formulations for such fiber reinforced ceramic composites and articles prepared therefrom. Thus, cellulosic materials are used as fillers in a ceramic matrix, where the loading of the cellulosic material is generally less than inorganic acidic/alkaline precursor components. The ceramic matrixes prepared by these methods demonstrate superior mechanical properties, improved ductility and impact resistance compared to cementatious inorganic acid-base cements, such as phosphate, oxychloride, or oxy-sulfate cements, and are more homogeneous as compared to those produced by methods and materials previously reported.

Inorganic acidic/alkaline component solutions, e.g., aqueous solutions, as disclosed and described herein together with cellulosic fiber can provide improved reinforced ceramics.

Inorganic Fiber Composites

Cellulosic materials, having a binder as an inorganic acidic/alkaline adhesive are generally understood as inorganic fiber composite articles prepared with, for example an inorganic acidic/alkaline adhesive, where the cellulosic material is present in the composite in excess to that of the inorganic acidic/alkaline adhesive. For example, in certain aspects, inorganic fiber composites as presently disclosed comprise more than about 35-40 wt percent fiber in the composite. In this case, a smaller loading of the inorganic acidic/alkaline adhesive is mixed with the cellulosic material fibers to form a pulp, which is then shaped by pressing, injection molding and extrusion. The resulting product is a cellulosic material with a ceramic acting as reinforcement and as a result, the composite can possess high flexural strength, high impact resistance, zero flammability and excellent insulation properties.

The resulting products, either fiber reinforced ceramic or inorganic fiber composite, are dense, fire resistant, and have very low porosity. These materials exhibit similar or superior mechanical properties to comparative non-inorganic fiber composites, but advantageously are flame retardant, totally free from volatile organic compound emissions, and have much lower carbon foot print compared to organic polymer composites.

Inorganic Acidic Component (A)

The first component (A) of the presently disclosed inorganic acidic/alkaline adhesive is an acidic precursor component. In one aspect, the acidic precursor component comprises a phosphate, an oxy-chloride, oxy-sulfate, or mixtures thereof. Table 1 lists solubility of exemplary inorganic acidic precursor components, which include, for example, phosphates, and oxy-chlorides and oxy-sulfates.

TABLE 1

Solubility of acid-phosphates, and magnesium chloride and sulfate, and pH of the solution.

| Inorganic Acidic Precursor Component | Solubility (grams/100 cc) | Solution pH |
|---|---|---|
| Sodium dihydrogen phosphate ($NaH_2PO_4 \cdot 2H_2O$) | 71 (0° C.) | 4.3-4.9 |
| Ammonium dihydrogen phosphate ($NH_4)H_2PO_4$ | 39.5 (25° C.) | 4.4-4.8 |
| Potassium dihydrogen phosphate ($KH_2PO_4$) | 25.1 (25° C.) | 4.2 |
| Calcium dihydrogen phosphate $Ca(H_2PO_4)_2 \cdot H_2O$ | 1.8 (30° C.) | 2.5 |
| Magnesium dihydrogen phosphate ($Mg(H_2PO_4)_2 \cdot 2H_2O$) | 22.3 (25° C.) | 2.5 |
| Monoaluminum phosphate ($AlH_3(PO_4)_2 \cdot H_2O$) | 50 | 2 |
| $MgCl_2$ | 55.5 (25° C.) | ≥7 |
| $MgSO_4$ | 37.4 (25° C.) | ≥7 |

Table 1 indicates that different acid-phosphates, chlorides and sulfates of Mg have different solubility. Using the acid-salt of maximum solubility, it is possible to introduce a maximum amount of the acid-component to form the binder. The term "inorganic acidic component" is inclusive of the Lewis acids $MgCl_2$ and $MgSO_4$ and not limited by the solution pH of the component.

In one aspect, the inorganic acidic precursor is provided as a solution or paste comprising a saturated solution of phosphoric acid or an acid phosphate salt. The phosphoric acid or acid phosphate salt comprises a monovalent alkali metal such as sodium (sodium dihydrogen phosphate, $NaH_2PO_4$), potassium, (potassium dihydrogen phosphate, $KH_2PO_4$), cesium (cesium dihydrogen phosphate, $CsH_2PO_4$), or that of any divalent metal, or trivalent metal, such as magnesium (magnesium dihydrogen phosphate, $Mg(H_2PO_4)_2 \cdot 2H_2O$), or calcium (calcium dihydrogen phosphate, $Ca(H_2PO_4)_2 \cdot 2H_2O$), or zinc (zinc dihydrogen phosphate, $Zn(H_2PO_4)_2$), or trivalent metal, such as aluminum (mono aluminum hydro phosphate, $AlH_3(PO_4)2 \cdot H_2O$). In one aspect, use of sodium dihydrogen phosphate is preferable over potassium dihydrogen phosphate. In another aspect, aluminum dihydrogen phosphate is preferable over potassium dihydrogen phosphate. Cations such as Na, K, or Mg may affect the quality of the adhesives and therefore control of cations as well as the solubility of the inorganic acidic precursor solution may be adjusted to optimize the adhesive.

In one aspect, a method to enhance the extent of acid-base reaction by adjusting the pH of the acid and alkaline solutions is provided. In the acid-phosphate precursor, a small amount of phosphoric acid is added to increase the acidity of the solution, which in turn increases the phosphate content ($P_2O_5$ content) of the acid-phosphate component. For example, use of an aqueous solution of potassium dihydrogen phosphate acid precursor is not particularly efficient for the methods disclosed and described herein because of its low solubility of about 20 g/ml at a solution pH of about 4.2. Therefore, to reduce the pH to less than 4, a predetermined amount of 85 wt. % saturated phosphoric acid is added to the solution of potassium dihydrogen phosphate precursor solution. In one preferred aspect, the amount of 85 wt. % saturated phosphoric acid added to the solution of potassium dihydrogen phosphate does not exceed 5 grams/100 grams of potassium dihydrogen phosphate precursor solution, and the pH of the potassium dihydrogen phosphate precursor solution is targeted at about pH 3. For this adhesive, the adjustment of pH from about 4.2 to less than 4 increases the phosphate content sufficiently and provides an improved inorganic phosphate acid/base adhesive for preparing fiber composite articles. Such composite articles have improved properties and performance attributes over composite articles prepared using a potassium dihydrogen phosphate precursor solution of greater than about pH 4.2.

In general, the pH of the inorganic acidic precursor solution can be between about 0-6, preferably between about of 3-5, and most preferably between about 3-4.5.

In general, solutions in the pH range of 3 to 5 for production of the disclosed inorganic adhesives are preferred because below this pH, such solutions become very corrosive, and above the pH range, they react too slowly to form the adhesive, possibly reducing the performance attributes of the composite articles.

To adjust the solubility of the chloride and sulfate solutions, hydrochloric acid and sulfuric acid may be used, respectively, in the similar way while producing oxy chloride and oxy sulfate adhesives.

Alkaline Component (B)

The second component of the presently disclosed inorganic acidic/alkaline adhesive is an alkaline precursor component (B). In one aspect, the alkaline precursor component is a metal hydroxide solution. Certain oxide starting materials may be used provided that they form hydroxides. Examples of alkaline component solutions comprise, for example, saturated solutions or pastes produced by fully or partially dissolving a sparsely soluble oxides or hydroxides, including but not limited to, any monovalent or divalent metal oxide or hydroxide of magnesium, calcium, iron, manganese, zinc, barium, strontium, as well as trivalent oxides such as aluminum, iron, or lanthanides. In one aspect, the alkaline component solution is a hydroxide rich brine obtained from the mines of natural ores of the oxide or hydroxide, or similar solutions produced during separation of other gangue material from the natural ores. In another aspect, the alkaline component solution is pregnant Bayer liquor of aluminum hydroxide produced during Bayer process of separation of alumina from bauxite. In a preferred aspect, the alkaline component solution is magnesium hydroxide brine obtained by steam injection in magnesium ore deposits. Table 2 provides the aqueous saturation concentration of different hydroxides and their resulting aqueous pH. Hydroxide solutions of maximum solubility are generally preferred for the alkaline component.

TABLE 2

Saturation concentration of hydroxides in aqueous solutions and their pH

| Hydroxide | Saturation concentration (grams/100 cc) | pH |
|---|---|---|
| Sodium hydroxide (NaOH) | 108 (20° C.) | >13 |
| Potassium hydroxide (KOH) | 112 (20° C.) | >13 |
| Calcium hydroxide ($Ca(OH)_2$) | 0.17 (10° C.) ($K_{sp} = 5.5 * 10^{-6}$) | >13 |
| Magnesium hydroxide ($Mg(OH)_2$) | 0.00125 ($K_{sp} = 5.61 * 10^{-12}$) | 10.45 |
| Zinc hydroxide ($Zn(OH)_2$) | 0.000353 ($K_{sp} = 3 * 10^{-17}$) | 8.85 |
| Barium hydroxide ($Ba(OH)_2 * 8H_2O$) | 3.89 (20° C.) | >12 |

TABLE 2-continued

Saturation concentration of hydroxides in aqueous solutions and their pH

| Hydroxide | Saturation concentration (grams/100 cc) | pH |
|---|---|---|
| Aluminum hydroxide (Al(OH)$_3$) | 0.0001 ($K_{sp}$ = 1.3 * 10$^{-33}$) | ~7 |
| Iron hydroxide (Fe(OH)$_3$) | 0.00015 ($K_{sp}$ = 2.79 * 10$^{-39}$) | ~7 |

For the alkaline precursor component, the solubility may be increased by increasing the pH. Some hydroxides have naturally high pH and high solubility. Calcium hydroxide (Ca(OH)$_2$) is such a hydroxide. Even magnesium hydroxide (Mg(OH)$_2$), works well. However, if the solubility is lower than approximately 10, it is preferred to add an alkaline hydroxide such as Na(OH), or KOH to increase the solubility of the hydroxide component. The amount of alkaline hydroxide needed is generally small and hence it does not change the chemistry of the resulting composite article significantly. In one aspect, the pH of the alkaline precursor solution is between about 8-14, preferably between about 9-12, and most preferably between about 10-11. As handling of very alkaline products is difficult, in one at least one aspect, a maximum pH of about 11 is provided for the alkaline component precursor solution. As discussed in the Experimental section, aqueous magnesium brine, which has a pH of about 10.2, works very well as an alkaline component precursor in the methods disclosed and described herein.

Inorganic Acidic/Alkaline Adhesives

Combining the inorganic acidic precursor component disclosed above with the alkaline precursor component provides an effective inorganic adhesive for preparing inorganic-organic composites. In one preferred aspect, the precursor solutions are adjusted so that maximum amount of acidic precursor and alkaline precursor is dissolved in the particular precursor solution. Ranges of acidic and alkaline solutions may be used that provide maximum solubility of the precursor components. As mentioned above one or both of the precursors may be heated.

Once the inorganic acidic component precursor and alkaline component precursor solutions are optimized for their solubility and/or pH, combining the precursor solutions provides for an inorganic adhesive useful for organic composite articles. Suitability and proportion of these components and their compatibility is generally governed by the stoichiometry of the corresponding acid-base reaction. Table 3 summarizes these combinations, and the chemical formulae for the resulting inorganic adhesives.

In Table 3, the water, which is either added to initiate the reaction or the water formed during reaction, may partially go into the crystal structure as bound water. Table 3 does not distinguish between the two, but that distinction is of little consequence because the free water will evaporate when the product is dried, but the bound water will remain in the structure. Amounts of bound water in the inorganic phosphate product may be qualitatively or quantitatively determined by using analytical tools such as differential scanning calorimetry.

TABLE 3

Examples of acid-base reactions suitable for the methods disclosed herein.

| Components | General equations | Examples |
|---|---|---|
| Monovalent and divalent metal oxides, and monovalent and divalent metal phosphates | $sA^m_{(3-m)}O + B^s(H_2PO_4)_s = B(A_{3-m}PO_4)_s + sH_2O$<br>A has a valency of m = 1 or 2.<br>B has a valency of s = 1, or 2. | m = 1, s = 1<br>$Na_2O + KH_2PO_4 = Na_2KPO_4 + H_2O$<br>m = 2, s = 1<br>$MgO + KH_2PO_4 = MgKPO_4 + H_2O$<br>m = 2, s = 2<br>$2ZnO + Mg(H_2PO_4)_2 = Mg(ZnPO_4)_2 + 2H_2O$<br>m = 1, s = 2<br>$2K_2O + Mg(H_2PO_4)_2 = Mg(K_2PO_4)_2 + 2H_2O$ |
| Monovalent and divalent metal hydroxides, and monovalent and divalent metal phosphates | $(2s/m)A^m(OH)_m + B^s(H_2PO_4)_s = B(A_{(2/m)}PO_4)_s + 2sH_2O$<br>A has a valency of m = 1 or 2.<br>B has a valency of s = 1, or 2. | m = 1, s = 1<br>$2NaOH + KH_2PO_4 = Na_2KPO_4 + 2H_2O$<br>m = 2, s = 1<br>$Mg(OH)_2 + KH_2PO_4 = Mg_2KPO_4 + 2H_2O$<br>m = 2, s = 2<br>$2Zn(OH)_2 + Mg(H_2PO_4)_2 = Mg(ZnPO_4)_2 + 4H_2O$<br>m = 1, s = 2<br>$4KOH + Mg(H_2PO_4)_2 = Mg(K_2PO_4)_2 + 4H_2O$ |
| Monovalent and divalent metal oxides, and trivalent metal phosphates | $3A^m_{(2/m)}O + 2B^3H_3(PO_4)_s = (2/m)A_3B_m(PO_4)_s + 3H_2O$<br>A has a valency of m = 1 or 2.<br>B has a valency of 3 | m = 1<br>$3K_2O + 2AlH_3(PO_4)_2 = 2AlK_3(PO_4)_2 + 3H_2O$<br>m = 2<br>$3MgO + AlH_3(PO_4)_2 = Al_2Mg_3(PO_4)_2 + 3H_2O$ |
| Quadrivalent metal oxides or hydroxides, and divalent metal phosphates | Quadrivalent oxides<br>$sAO_2 + B^s(H_2PO_4)_s = B(AOPO_4)_s + sH_2O$<br>A has a valency of 4 and s = 1 or 2.<br>Quadrivalent oxides<br>$sA(OH)_4 + B(H_2PO_4)_s = B[AOH)_2PO_4]_s + 2sH_2O$<br>A has a valency of 4 and s = 1 or 2. | S = 1<br>$ZrO_2 + KH_2PO_4 = ZrOKPO_4 + H_2O$<br>S = 2<br>$2ZrO_2 + Mg(H_2PO_4)_2 = Mg(ZrOPO_4)_2 + 2H_2O$<br>S = 1<br>$Zr(OH)_4 + KH_2PO_4 = Zr(OH)_2KPO_4 + 2H_2O$<br>S = 2<br>$2Zr(OH)_4 + Mg(H_2PO_4)_2 = Mg[Zr(OH)_2PO_4]_2 + 4H_2O$ |

In Table 3, suitable examples of monovalent elements, such as sodium (Na), potassium (K), or ammonium ($NH_4$) are listed. Similarly, suitable examples of major divalent elements one may use are magnesium, calcium, zinc, copper, barium, lanthanides, etc., while trivalent elements are aluminum, iron etc., and an example of quadraivalent element is zirconium (Zr). These are listed as exemplary examples of elements suitable for forming the adhesives, but other elements that are suitable for the combinations given above may also be used.

In one aspect, combinations of low atomic mass and high atomic mass elements comprising the acidic/alkaline precursors can be used to provide an inorganic composite possessing improved radiation shielding, e.g., of both neutron and gamma radiation in a single composite article. For example, barium and lanthanide elements can be employed in the precursor components for shielding both neutrons and gamma particles.

One or both of the inorganic acidic/alkaline precursor component adhesives disclosed and described herein can preferably be formed from aqueous solutions. In one aspect, the average particle size of one or both precursors is less than 40 micron, less than 30 micron, less than 20 micron, less than 10 micron, less than 1 micron, less than 0.1 micron to about 0.01 micron, if used as in form of suspension, gel, or as paste. Such particle sizes can be achieved using sieving or other methods known in the art.

When the organic material comprises cellulose, it is generally believed that the components of the inorganic adhesive will be retained on or in the cellulose domains of the wood/fiber by chemical/non-chemical interactions, for example, hydrogen bonding and/or ether linkages, between the hydroxyl/carboxyl groups of the cellulose repeat units and the inorganic components of the adhesive. The final composite product comprising inorganic acidic/alkaline binders likewise is believed to provide hydrogen and ether linkages with cellulose during reaction and setting. Energy requirements for forming such bonds can be provided from the energy produced by the exothermic acid-base interaction and/or from external sources (external heating).

Use of starch as an adhesive for natural fiber wall boards or calcium carbonate for paper production is known. However, starch and calcium carbonates as adhesives are easily affected by moisture and the products lose their integrity when they are wet. On the other hand, the inorganic acidic/alkaline adhesive solutions disclosed and described herein, exhibit low viscosity that can impregnate the cells of cellulosic materials. The inorganic acidic/alkaline adhesive solutions rise easily by capillary action in the voids of the cellulosic materials providing the composite article with a large bonded area per unit volume of the cellulosic material. Thus, a very high loading of fiber can be achieved using inorganic acidic/alkaline adhesive solutions and the resulting composite articles exhibit superior mechanical and physical properties compared to organic-based fiber composites for certain applications as discussed further below.

Methods of Producing Inorganic Organic Composite Products

The descriptions below are intended to represent common practice methods given as examples in the industry dealing with composite products and do not limit applications of the materials disclosed herein in anyway. The materials and compositions presented herein are very versatile and may be used to produce novel composites by various techniques, which only demonstrates some of the benefits of the materials and compositions presented herein. Cellulose as an organic material is exemplified.

In at least one aspect, methods are provided for producing composites comprising mixing cellulosic materials in either an inorganic acidic precursor solution or alkaline precursor solution first, and then contacting the first precursor solution with the second precursor solution to initiate the acid base reaction. In further aspects, methods of applying pressure and temperature and forming shapes during the reaction are also disclosed. These include, direct pressing the reacting composition in an open mold configured in geometric shapes, extrusion, vacuum molding, injection molding, and any other type of molding process used in the plastics industry. These processes may be followed by additional curing under controlled conditions.

In one aspect, inorganic binder formed by combining the inorganic acidic precursor and alkaline precursor component base for providing an acid-base reaction that bind cellulosic materials producing inorganic fiber composites is disclosed and described. Unlike organic polymeric materials that are used in commercial fiber composites, use of these inorganic acidic/alkaline precursor adhesives does not produce volatile organic compounds, and their carbon foot print is significantly lower than that of conventional organic binders. The resulting inorganic-cellulosic composites exhibit zero flame spread, are insulating and fire resistant materials. They exhibit superior mechanical properties compared to their counterparts produced by use of organic binders.

Preferred methods of forming the disclosed inorganic cellulosic composites are open mold pressing or compression molding, vacuum impregnation, injection molding, and extrusion. When the disclosed inorganic adhesives are used in an open mold press, the cellulosic material is first wetted thoroughly with either the acidic precursor or alkaline precursor solution. The wetted cellulosic material is then placed in the mold and second solution is introduced before molding. Pressure is applied simultaneously to squeeze out excess solution. Depending on the product density desired, the pressure may be adjusted so that products of density as low as 0.5 $g/cm^3$ to as high as 1.5 $g/cm^3$ can be produced. Lower density inorganic composite articles generally provide low thermal conductivity and hence are useful as high insulation products. Higher density composite articles provide better structural integrity and strength. To produce inorganic composite articles of intricate shapes, simple molding techniques can be used. For example, pulp of fiber and the acid-base paste is introduced in molds and the pulp is allowed to set into the shape of the mold. It is then demolded to obtain the desired product. The temperature of the mixture within the mold generally rises as the adhesive precursor components react and the binder is formed. Generally, articles prepared with the disclosed inorganic adhesives may contain some excess water, which can be removed by heating the sample at approximately 400° F. However, products produced by fiber reinforced ceramic composites set without any excess water and hence do not need additional drying.

In another aspect, vacuum impregnation is used to impregnate the cellulose fibers with the inorganic acidic/alkaline precursor component. In this method, the cellulose is introduced into a mold of a desired shape, and the inorganic acidic/alkaline precursor components are urged to the mold, preferably via two separate inlets, by creating vacuum in the mold. The inorganic acidic/alkaline precursor components mix in the presence of the cellulose and are subsequently drawn out. The two solutions independently and/or in combination wet out the cellulose fibers, the acid-base reaction forming binder of the composite. Any desired shape can be prepared by this method. In other aspects, an open mold may be used without vacuum.

In vacuum impregnation, the cellulosic material is placed in the mold and either the acidic or alkaline precursor solution is urged into the cellulosic material, for example, using a vacuum pump. The first precursor solution will wet the cellulosic material and also shape it into the form of the mold. Excess solution is drawn out during the impregnation. Then the second precursor solution is urged into the wet material the same way. The precursors will react within the cellulosic mixture and it will solidify. Optionally, the mold can be heated simultaneously to accelerate the reaction and/or dry out the form. In another aspect, both precursor solutions are introduced simultaneously to the cellulosic material using a plural inlet for the inorganic acidic and alkaline precursor solutions and both wet the fibers and initiate the reaction.

For injection molding, saw dust or wood flour is wetted with either the inorganic acidic or alkaline precursor first solution and is fed through a hopper to a screw mixer. The corresponding second precursor solution is fed through another hopper into this mixer, where the two streams are mixed thoroughly. The resulting pulp is then injected into molds of desired shapes. In rapid-injection molding, it is also possible to mix all three components (inorganic acidic and alkaline components and wood) together in one hopper and injection mold. Moderate heat may be applied if necessary, but most of the compositions presented above are room temperature setting materials and therefore, a heating step can be eliminated.

Injection molding may also be used by laying woven mats of natural fibers and then injecting the above inorganic adhesive through layers of the mats. The mats may be layered in molds of desired shapes and thus produce fiber reinforced products of any shape that exhibit very high ductility and strength.

In the processes describe above, the cellulosic material can be contacted with either acidic precursor or alkaline precursor solution first, followed by the respective second precursor solution. Contact of the cellulose with the precursor solutions can be during application of pressure and elevated temperature. Choosing which order of contact by the precursor solutions used for soaking the cellulosic material can be selected depending on the pH of the cellulosic material chosen. For example, addition of the alkaline precursor component first is preferred for cellulosic material treated to remove part of hemicellulose and extractibles, which is generally alkaline, whereas addition of the inorganic acidic precursor component first is preferred for cellulosic material pretreated with an acid.

In other aspects, conventional extrusion techniques using the above inorganic precursor components and cellulosic materials can be used to produce lightweight products, such as packaging or insulating products. Thus, pulp can be produced by premixing the inorganic acidic and alkaline precursor solutions with wood flour or cellulose powder. The pulp formed by this mixture can be extruded using high rpm mixing. Optionally, a small amount of boric acid can be added to retard the rate of reaction.

Sonic mixers may be used to wet out the cellulosic material with either the alkaline or acidic precursor components or their mixture, and in combination with open mold, vacuum molding, or extrusion to produce composite articles. Use of sonic mixer can provide better wetting of cellulose and improved impregnation of the inorganic adhesive into the capillaries of the fibers.

In one aspect, small amount of about 1-15% wood fiber is added when extruding the cellulosic materials and inorganic acidic/alkaline precursor components to provide flexural strength. Using higher amount of fiber entangles the fiber on the screw and may interfere with the function of the extruder. In other methods of production, however, higher amount of fibers may be added as needed to adjust properties of the composite article.

Active fillers, such as oxide minerals may be used in the inorganic adhesive composition that can reduce the total amount of inorganic acidic/alkaline components used. These fillers include for example, wollastonite ($CaSiO_3$), fly ash, bottom ash, magnesium silicate, talc, mullite, or any minerals that exhibit even slight solubility in an acid-phosphate. It is generally believed that only dissolved active fillers form part the binder binding cellulose.

Referring now to the drawings, FIGS. 1-4 illustrate different methods of producing an inorganic composite. Thus, FIG. 1 depicts process 100, where cellulosic material is provided in step 110 and acid treated in step 120. The acidic cellulosic material is mixed with inorganic acidic precursor component A in step 130. Acidic inorganic pulp is prepared in step 140. The pulp is contacted with alkaline component precursor B in step 150 to allow for acid-base reaction of precursor components, followed by a shape forming step 160 and formation of a composite (step 170).

Figure 2:
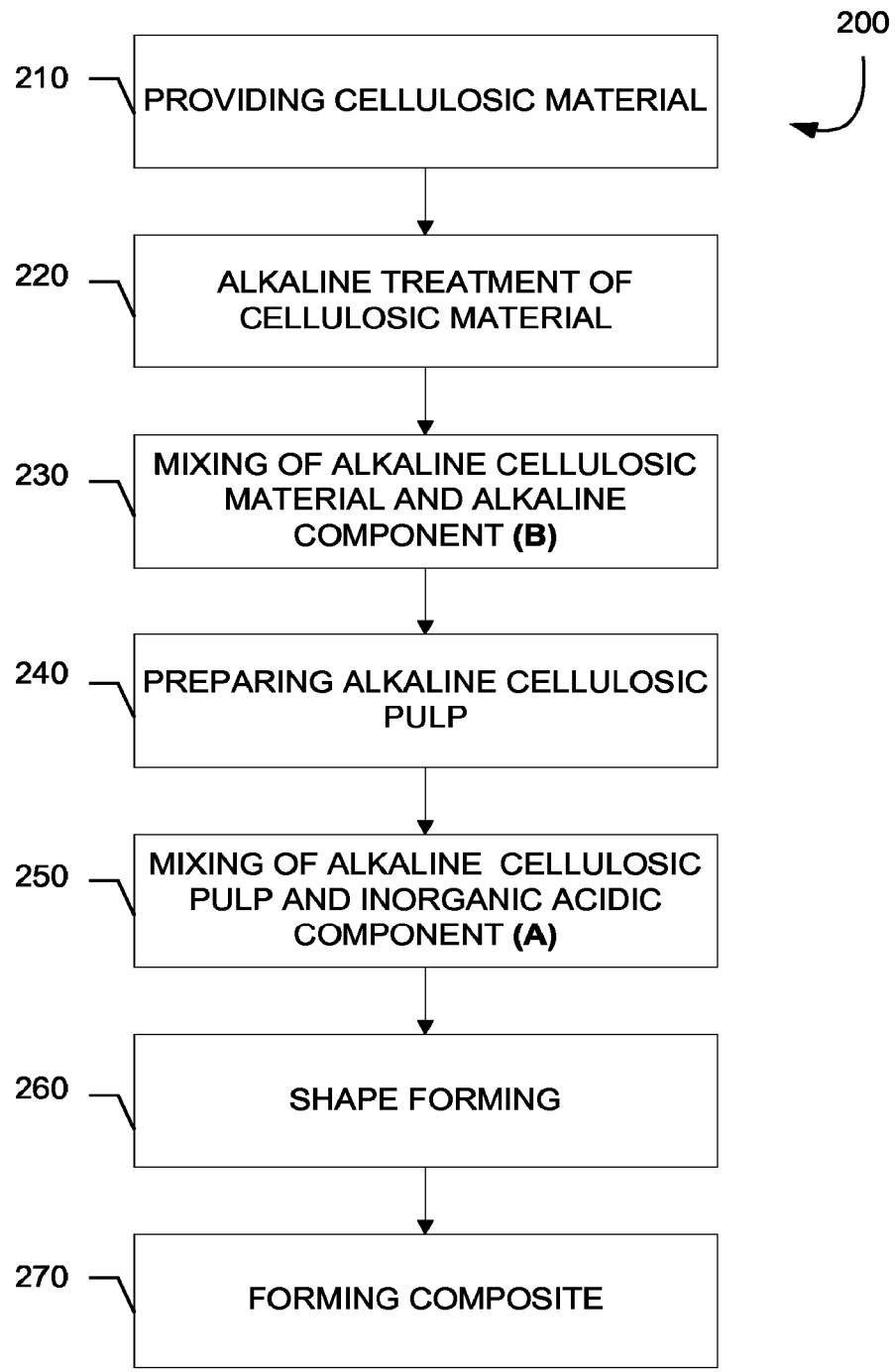
FIG. 2 depicts a second aspect of preparing an inorganic fiber composite as disclosed and described.

FIG. 2 depicts process 200, where cellulosic material is provided in step 210 and alkaline treated in step 220. The alkaline cellulosic material is mixed with alkaline precursor component B in step 230. Alkaline pulp is prepared in step 240. The pulp is contacted with inorganic acidic component precursor A in step 250 to allow for acid-base reaction of precursor components, followed by a shape forming step 260 and formation of a composite (step 270).

Figure 3:
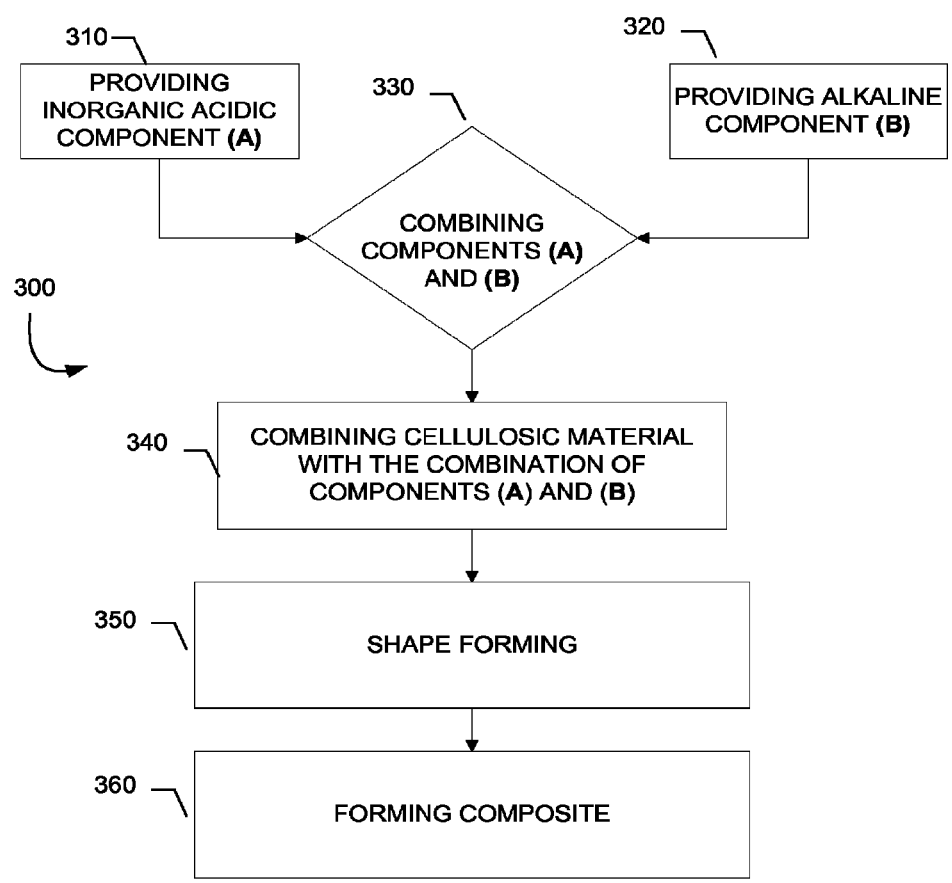
FIG. 3 depicts a third aspect of preparing an inorganic fiber composite as disclosed and described.

FIG. 3 depicts process 300, where inorganic acidic precursor component A (310), alkaline precursor component B (320), are combined in step 330 to provide a slurry, which is then combined with and cellulosic material in step 340, followed by a shape forming step 350 (e.g., heat at 400° F.), and formation of a composite (step 360). For example, process 300 can be carried out using aluminum oxide as component B and any one of the acid-phosphate solutions of Table 1.

Figure 4:
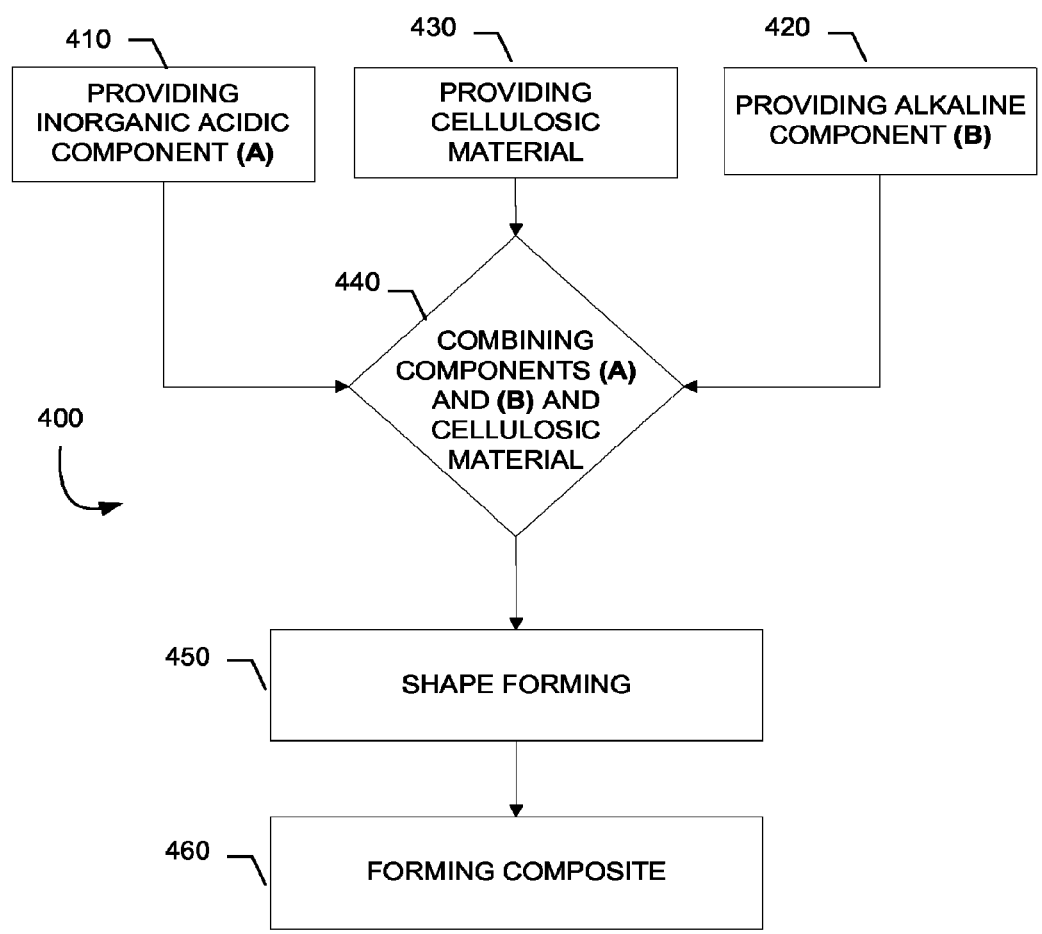
FIG. 4 depicts a fourth aspect of preparing an inorganic fiber composite as disclosed and described.

FIG. 4 depicts process 400 where inorganic acidic precursor component A (410), cellulosic material (430) and alkaline precursor component B (420), are combined in step 440 to provide a slurry, followed by a shape forming step 450 and formation of a composite (step 460). Process 400 is generally carried out when mixing cellulosic material with inorganic acidic and alkaline powder pastes rather than solutions, for example, in preparation of fiber reinforced ceramic composites, in which cellulosic material is essentially only the filler.

Figure 5:
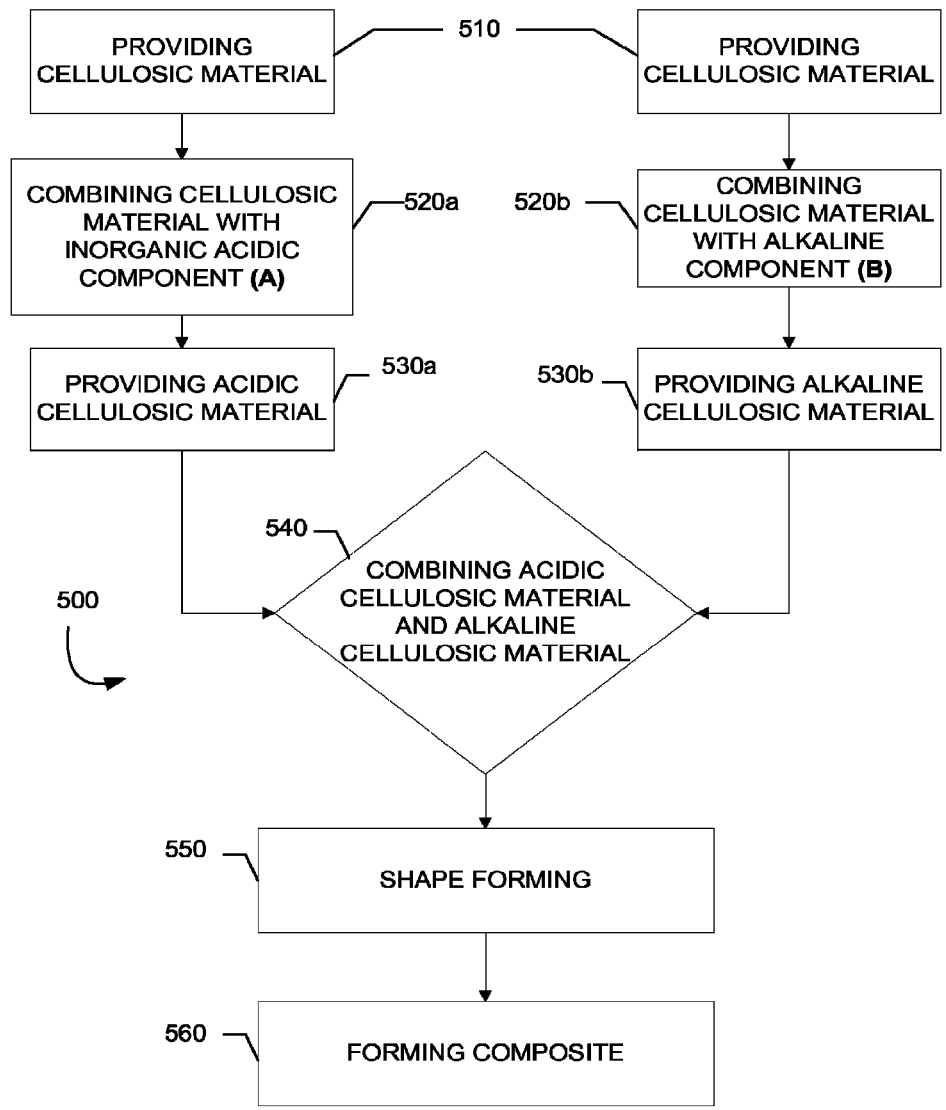
FIG. 5 depicts a fifth aspect of preparing an inorganic fiber composite as disclosed and described.
Figure 6:
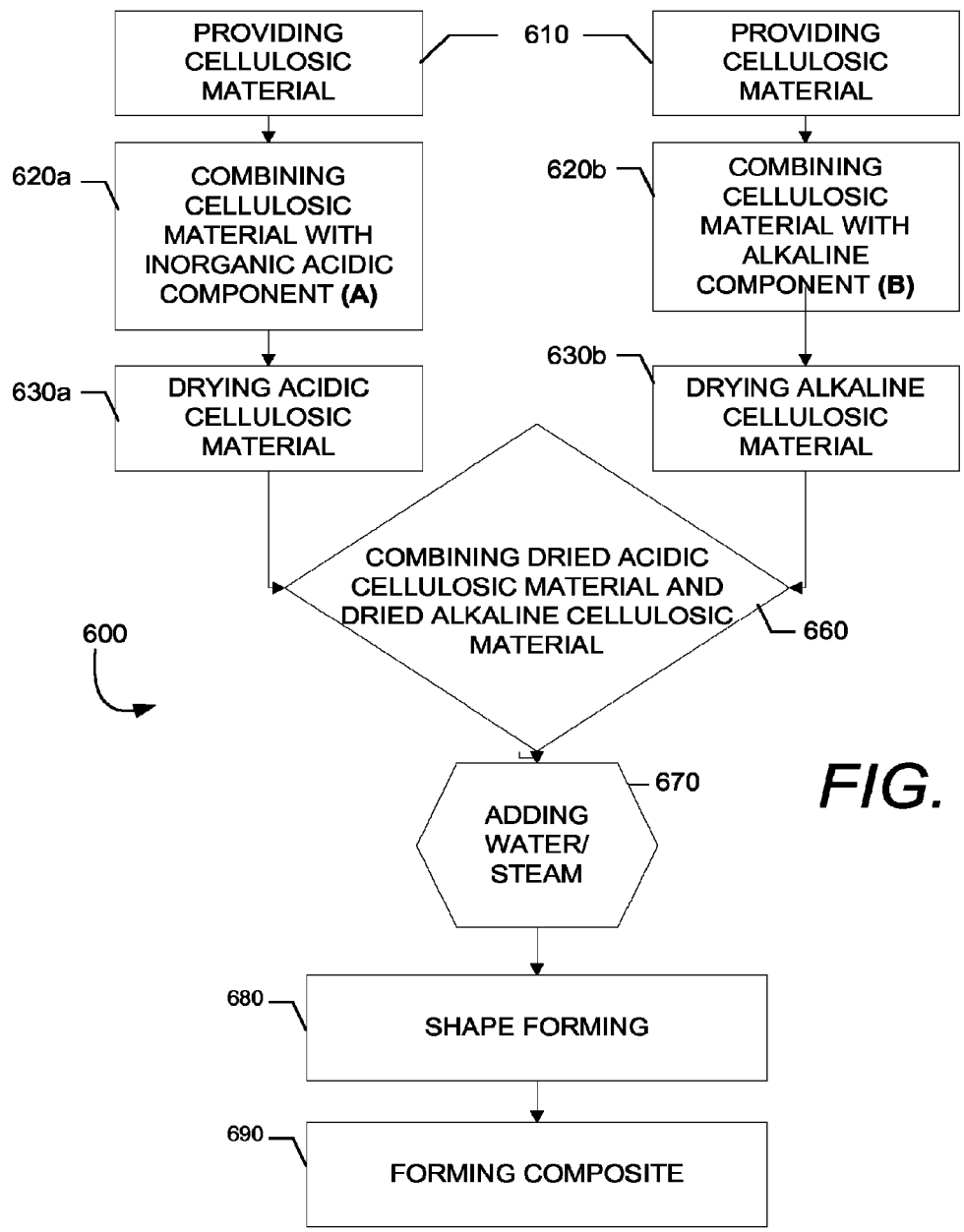
FIG. 6 depicts a sixth aspect of preparing an inorganic fiber composite as disclosed and described.

FIGS. 5-6 illustrate different methods of preparing intermediate precursor component materials combined with cellulosic materials. Thus, FIG. 5 depicts process 500, where cellulosic material (510) and inorganic acidic precursor component A are combined in step 520a to provide intermediate inorganic acidic-cellulosic material (530a). Likewise, cellulosic material (510) and alkaline precursor component B are combined in step 520b to provide intermediate alkaline-cellulosic material (530b). Intermediates 530a and 530b are combined in step 540, followed by a shape forming step 550 and formation of a composite (step 560).

FIG. 6 depicts process 600, where cellulosic material (610) and inorganic acidic precursor component A are combined in step 620a to provide intermediate inorganic acidic-cellulosic material (630a), which is dried in step 640 to provide material (650a). Likewise, cellulosic material (610) and alkaline precursor component B are combined in step 620b to provide intermediate alkaline-cellulosic material (650b), which is dried in step 640 to provide material (650b). Intermediates 650a and 650b are combined in step 660, and may be stored until use. Addition of an aqueous media in step 670, for example, water or steam, can be followed by a shape forming step 680 and formation of a composite (step 690).

Figure 7:
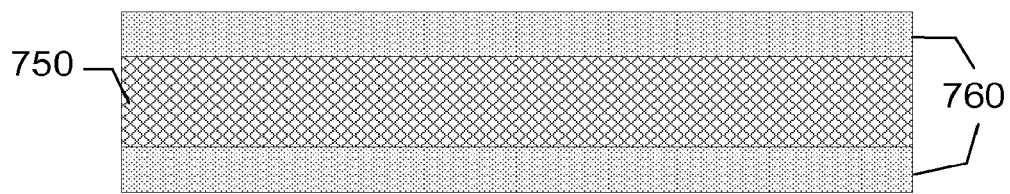
FIG. 7 depicts an aspect of a sandwich wall board or tiles using an inorganic fiber composite as disclosed and described.

FIG. 7 depicts the architecture of an inorganic ceramic sandwich panel produced, for example, by using fiber mats (750) wrapped around a wooden frame (not shown) and then using the inorganic acidic/alkaline precursor component compositions described herein to form layers (760) on both sides. Entrapment of air during this process provides for improved insulative properties. In other aspects, fiber composite as the core for insulation can be employed.

Figure 8:
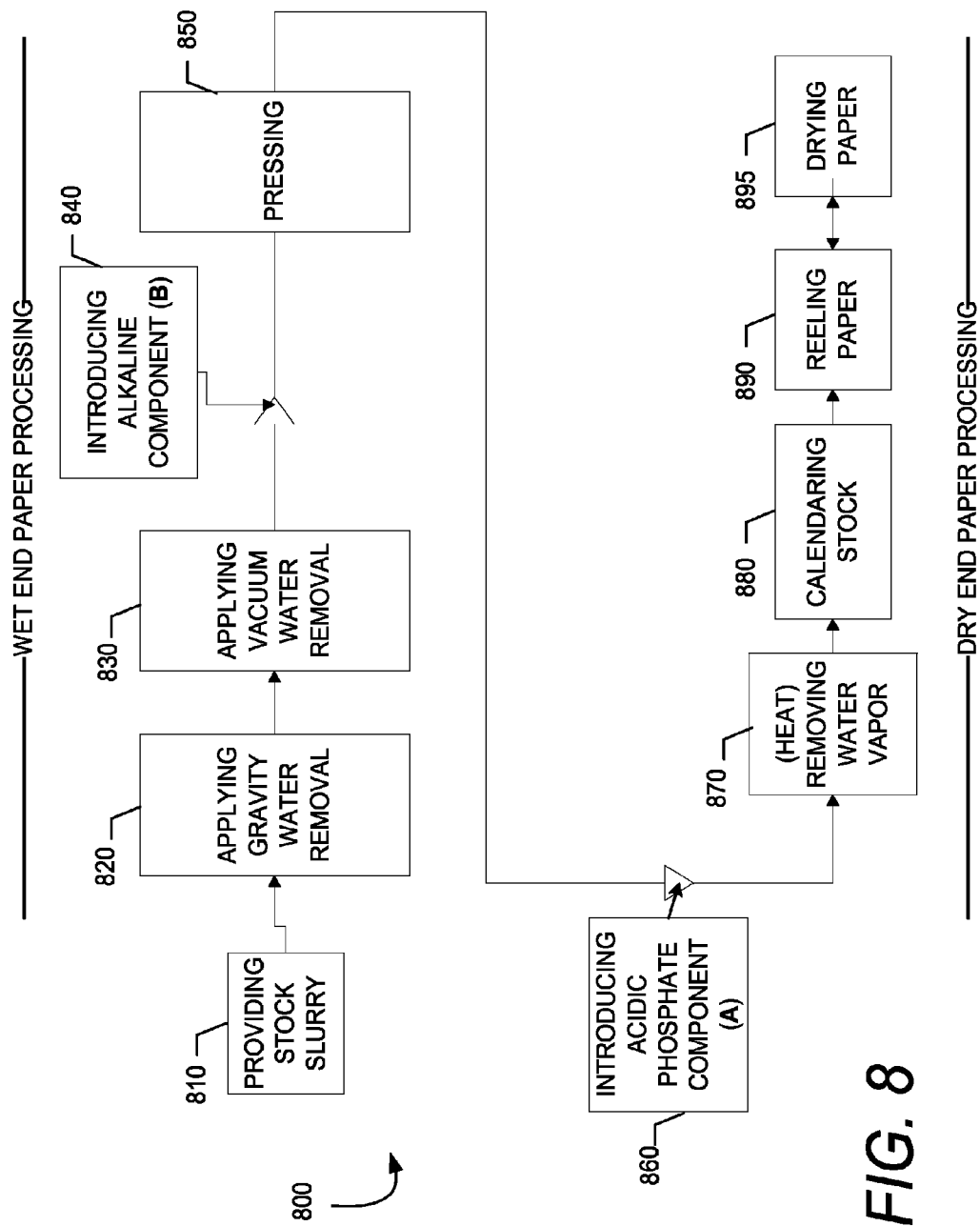
FIG. 8 depicts an aspect of producing paper and packaging material by using acid-base adhesive as herein disclosed and described.

FIG. 8 depicts process 800, schematically showing production of zero flame spread paper or packaging products using the inorganic adhesive compositions described above. Thus, stock slurry (810) is wet sufficiently with water (e.g., so that it can be rolled into thin two dimensional forms), excess water is then removed in step 820 (e.g., gravity removal). Alkaline precursor component B is introduced to the wet web of the cellulosic material in step 840, followed by passed through wet pressing section (step 850). Inorganic acidic component A is introduced in step 860. Process steps 870, 880, 890 and 895 provide for optional heating with water removal, calendaring, reeling and drying, respectively. These later steps help to initiate the acid/base reaction in the wet cellulosic web into two dimensional forms. The resulting product is a zero flame spread paper or packaging material, depending on thickness of the product.

Modification of the process 800 for producing zero flame spread paper produced by using the inorganic acidic/alkaline precursor adhesive disclosed and described herein comprises contacting (e.g., soaking) the cellulosic material fibers in dilute inorganic acidic component precursor solutions first. The resulting thin slurry is passed through a screen to remove the excess acidic solution. The wet fibers are then contacted (e.g. sprayed) with the alkaline precursor solution and dried. Excess inorganic acidic solution can now be recycled to produce next batch of paper. Likewise, in another aspect, process 800 can comprises wetting the fiber with alkaline precursor solution first and contacting with the inorganic acidic precursor solution. In some aspects, wetting the fiber with acidic solution first and then recycling the acidic solution may be more economical.

Figure 9:
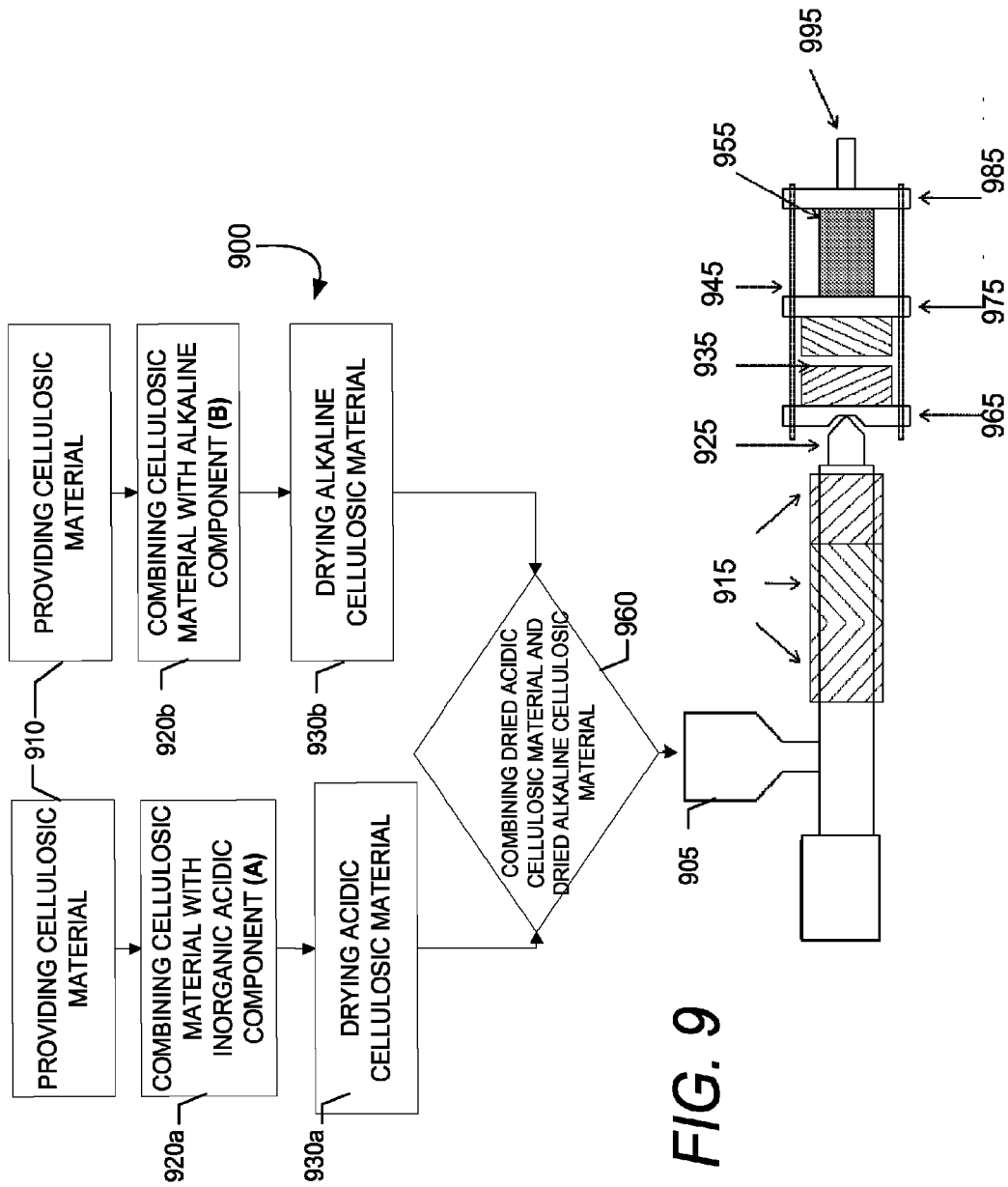
FIG. 9 depicts an aspect of producing inorganic fiber composite materials by using injection molding technique as herein disclosed and described.

FIG. 9 depicts an injection molding process 900 using the inorganic acidic/alkaline precursor adhesive disclosed and described herein in combination with cellulosic material. Thus, cellulosic material (910) and inorganic acidic precursor component A are combined in step 920a to provide intermediate inorganic acidic-cellulosic material (930a), which is dried in step 940 to provide material (950a). Likewise, cellulosic material (910) and alkaline precursor component B are combined in step 920b to provide intermediate alkaline-cellulosic material (950b), which is dried in step 640 to provide material (950b). Intermediates 950a and 950b are combined in step 960, and may be stored until use. Introduction of dried intermediates to a hopper (905) of an injection molding machine, fed through screw feeder with heating via heaters (915) optionally with aqueous media or steam, and injected thru nozzle (925) into mold (935) with compression via clamping unit (955) and plates (965, 975, 985) to provide formation of a composite of desired shape, which is ejected via ejector (995). Changing the pressure and orifice of the feeder provides for adjustment of material characteristics such as density, homogeneity, and consistency of the composite articles.

Applications and Products

Using the materials and methods of the present disclosure, a range of structural materials and products can be fabricated.

All these products are unique in their characteristics compared to the existing commercial products made from composites of organic polymers and natural fiber. These characteristics include: more homogenous ceramic binder; zero flame spread; zero emission of volatile organic compounds (VOCs); low water absorption; low carbon foot print; lower cost of processing; and safe disposal at the end of service.

Most convention composites based on organic polymer and natural fiber such as oriented strand board (OSB), or medium density fiber (MDF) board may be produced using the inorganic acid/alkaline adhesives and resultant ceramic binders disclosed and described herein. However, there exist additional applications and products that are unique to the inorganic acid/alkaline adhesives and are discussed below. For example, non-flammable wall boards, molded composite parts, flame-resistance paper and packaging materials, lightweight blowable insulation; and non flammable wall boards can be produced with the inorganic acidic/alkaline precursor component adhesives disclosed herein. The inner core in these products will be produced by fiber composites bonded by inorganic adhesives and the outer layers will be produced by fiber reinforced ceramic composites or paper disclosed and described herein. Fillers, such as ash, wollastonite, or any other low cost reactive fillers may be used.

In another aspect, wall boards and insulating tiles consisting of woven mats of cellulosic fiber stretched on both sides of a wooden frame, on which a phosphate or oxy chloride or oxy sulfate acid-alkaline component paste is sprayed to form an insulating wall board or a tile, is provided. In addition, molded composite parts can be produced by injection or extrusion techniques using the inorganic adhesives disclosed herein. Similar objects comprising fiber reinforced ceramic composites can also be produced by using simple room temperature molding techniques. Examples of intricate, nonflammable articles, parts, and architectural ornamental components that can be fabricated by the presently disclosed methods using the inorganic adhesive compositions include furniture, doors, door and window frames, cabinetry, replacement products for existing wooden products, wood floor, roof shingles non-flammable sidings and wood floor, wall and floor tiles, oriented strand board (OSB), medium density fiber (MDF) board, high density fiber board, and particle boards and any other wood component used in the construction industry.

Flame resistant paper and packaging material useful for packaging valuable commodities, preservable documents, can be also be prepared using the inorganic acidic/alkaline precursor component adhesives disclosed herein. Thin film vapor resistant sheeting/wrapping for commercial or residential dwellings having flame resistant properties can also be prepared using the methods and compositions disclosed herein. An example process for production of such paper and/or paper products is illustrated in FIG. 8.

Light weight blowable insulation can also be fabricated by the methods and compositions disclosed herein using shredded paper, or wood shavings, or saw dust, or other similar cellulosic material and bonding the same loosely with the herein disclosed adhesive compositions. In one aspect, the inorganic adhesive is mixed just prior to application and enough air is entrained in the product to provide blowable insulation.

Blades for wind turbines can be fabricated using the methods and compositions disclosed herein. Thus, conventional glass-fiber reinforced epoxy or phenolic based polymer composite materials can be modified or substituted with replacing the inorganic binder/cellulosic material composite composition and methods disclosed herein.

The products and applications presented above do not limit the range of products that can be produced by the materials and methods presented in this disclosure or their application and should not be construed anyway as limited to the products and applications discussed above.

Additives

The disclosed inorganic adhesives can optionally include one or more additives, such as surfactants (anionic or cationic, amphoteric, or nonionic), plasticizers, settling agents, rheology modifiers and/or suspending agents, anti-foamers and/or anti-algae agents.

Suitable anionic surfactants include, for example, perfluorooctanoate (PFOA or PFO), perfluorooctanesulfonate (PFOS), sodium dodecyl sulfate (SDS), ammonium lauryl sulfate, alkyl sulfate salts, sodium lauryl ether sulfate (SLES), alkyl benzene sulfonate, and soaps or fatty acid salts. Suitable cationic surfactants include, for example, cetyl trimethylammonium bromide (CTAB), alkyl timethylammonium salt, cetylpyridinium chloride (CPC), polyethoxylated tallow amine (POEA), benzalkonium chloride (BAC), and benzethonium chloride (BZT). Suitable amphoteric surfactants include, for example, dodecyl betaine, cocamidopropyl betaine, and coco ampho glycinate. Suitable nonionic surfactants include, for example, alkyl poly(ethylene oxide), alkylphenol poly(ethylene oxide), poloxamers or poloxamines (copolymer of polyethylene oxide or polypropylene oxide), octyl glucoside, decyl maltoside, cetyl alcohol, oleyl alcohol, and dodecyl dimethylamine oxide. Other surfactants alone or in combination with the above may be used, however, many of the above surfactants did not provide an observable difference in performance or function for certain inorganic adhesive precursors. Thus, the particular choice of surfactant is compositionally dependent and therefore, not predicable for any particular phosphate ceramic formulation.

Suitable plasticizers include, for example phthalates, trimellitates, aliphatic dibasic esters, phosphates, epoxides, or polyesters. Specific examples of plastizers include, for example, DOP (di(2-ethylhexyl) phthalate, DNP (di (isononyl) phthalate, TOTM (tris(2-ethylhexyl)trimellitate, TINTM (tris(isononyl)trimellitate, DOA (di(2-ethylhexyl) adipate, DNA (di(isononyl) adipate, DOZ (di(2-ethylhexyl) azelate, and DOS (di(2-ethylhexyl) sebacate. Other plasticizers alone or in combination with the above plasticizers may be used.

Anti settling agents include, for example, soya-lacithin, aluminium stearate, stearate coated calcium carbonate, modified cater oil or fatty acids, dipentene, pine oil, methyl ethyl ketoxime, di-isobutylene-maleic dispersion, ammonium polyacrylate, modified soya lecithin emulsion, polycaprolactonepolyol-polyethyleneimine block copolymer, polycaprolactonepolyol-toluene diisocynate copolymer, polyhydroxystearic acid, and alkyd based anti settling agents. Other settling agents alone or in combination with the above may be used.

Suitable rheology modifiers/suspending agents include hydrated magnesium aluminum silicate, lignosulfonates (calcium lignosulfonates, sodium lignosulfonates and the like), salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins, for example, LOMAR D® dispersant (Cognis Inc., Cincinnati, Ohio), polyaspartates, oligomeric dispersants, polymethacrylate salts, guar gum, diutan gum, welan gum, xanthan gum and/or other agents that function as a rheology modifiers/suspending agent.

Anti-foamers include, for example, silicon based anti-foam oil (siloxane with polyether terminal groups), acetylene glycol surfactants, and poly octyl acrylates. Other anti-foamers alone or in combination with the above may be used.

Phosphates are nutrients for algae and hence one should expect algae growth in the acidic component. To avoid algae, various commercial additives that inhibit any biological activity can be added. One example is cupric oxide. The addition of less than 1 wt. % of cupric oxide in the acidic phosphate precursor is sufficient to inhibit biological growth. Other commercial chemicals used to prevent algae or fungal growth may also be used, alone or in combination with the cupric oxide.

EXPERIMENTAL SECTION

Unless otherwise indicated, the recited wt. % of materials refers to dry weight of the starting materials, and not the wt. % of the material in the final composite article.

Example 1

Mono Potassium Phosphate/Magnesium Hydroxide Solution Cellulosic Composite

A homogeneous pulp was prepared from 50 grams of air dried sawdust mixed with 50 g of magnesium hydroxide solution (from boiling magnesium oxide and water) and an additional ~100 g of water. In a mixer, the pulp was further mixed for about one half hour to allow the alkaline precursor solution to penetrate into the sawdust. Then, 50 g of concentrated mono potassium phosphate solution was added to the pulp mixture and mixed continuously until the temperature of the mixture started rising. When the temperature was about 80° F., the entire mixture was poured into a mold and pressed at about 2000 psi for about 30 min. The resulting inorganic cellulosic composite article was placed into an oven and dried at warm temperature. The dried product was similar in appearance to composite product produced using organic adhesives. The inorganic cellulosic composite article was light, strong, and had good flexibility.

Example 2

Mono Aluminum Phosphate/Aluminum Hydroxide Cellulosic Composite

In a Resodyne mixer, 10 grams of sawdust was mixed with 20.3 g of a mixture of concentrated mono aluminum phosphate ($AlH_3(PO_4)_2 \cdot H_2O$) solution and aluminum hydroxide ($Al(OH)_3$) for 30 seconds. After mixing, the saw dust appeared moist, but remained as flakes of wood. The flakes were then pressed in a mold at about 2000 psi pressure for about 30 minutes. The resultant molded inorganic composite sample was placed in an oven for further curing at around 400° F. for about 30 min. It is believed at 400° F., the hydroxide and aluminum hydro phosphate react to form aluminum phosphate ($AlPO_4$), which provides the inorganic binder for the composite. After curing, the composite material was a rigid fiber board.

Example 3

Mono Potassium Phosphate/Magnesium Hydroxide Brine Cellulosic Composite

A pulp comprising 70 grams of air dried sawdust, 17 g of magnesium hydroxide brine solution and approximately 100 g of water was prepared. This pulp was mixed for 1.5 hr to allow the alkaline precursor solution to penetrate into the sawdust. To the pulp was added 123 g of concentrated mono potassium phosphate solution (23 wt. % mono potassium phosphate) and mixed continuously until the temperature started rising. When the temperature was about 80° F. the mixture was poured into a mold and pressed with a pressure of about 2000 psi for about one hour. The resulting composite product was placed into an oven and dried at warm temperature. The dried product was similar in appearance to composite product produced using organic adhesives. It was light, strong, and had good flexibility.

Example 4

Inorganic Composite Wall Board

A 33 wt. % solution of monopotassium phosphate was combined with a mixture of 17 wt. % magnesium hydroxide brine and 50 wt. % Class F fly ash to form a sprayable coating solution. The coating solution was sprayed on both sides of the panel produced in Example 1 and set instantly with some exothermic heat. The panel was hard yet slightly flexible, and was impermeable to water intrusion, lightweight and non-flammable. Its mechanical properties (e.g., flexibility) were superior to conventional wall boards as well as its flame retardancy properties.

Example 5

Forming Fiber Reinforced Ceramic Composite

In a Hobart mixer, 33 wt. % saw dust, 17 wt. % calcined magnesium oxide powder, the remainder mono potassium phosphate powder was mixed followed by the addition of an amount of water equal to that of the total powder providing a pulp. Mixing was done for approximately 10 min to allow as much of solid mono potassium phosphate as possible to dissolve. The resulting pulp was then pressed in a rectangular mold with a tight plunger at a pressure of 1000 psi. This pressing resulted in squeezing of excess solution out of the mold. The product was allowed to set completely for one day to provide a very hard rectangular ceramic specimen. When heated with a blow torch, some charring occurred only on the area where the flame touched the specimen. The flame did not spread on the entire surface. When the torch was removed, the flame also extinguished without spreading. Thus, the product had zero flame spread characteristics.

In another test, produced using the method disclosed above, a product comprising 33 wt. % saw dust, 33 wt. % Class C fly ash, 8 wt. % calcined magnesium oxide and the remainder mono potassium phosphate, was prepared resulting in a sample of lower durometer(hardness) than above. The flame spread characteristics results were essentially identical to the sample above, except that the product was not as hard. Replacing ash with wollastonite also showed similar characteristics, e.g., lower durometer with excellent flame retardancy characteristics. It is envisaged that replacing the calcined magnesium oxide alkaline precursor with a magnesium hydroxide brine solution would eliminate the need to add water or wait for dissolution of precursors, provide extended shelf life of the adhesive, and provide superior properties to that of Example 5.

Example 6

Zero-Flame Spread Paper

Flame retardant paper and packaging products were made using the methods disclosed and described herein using concentrated mono potassium phosphate solution and dilute magnesium hydroxide solution as the inorganic acidic/alkaline precursor components. Thus, unbleached kraft paper was placed in a bath of 1 kg of dilute magnesium hydroxide (6% solution) and in 250 g of mono potassium phosphate bath (~20% solution) for 30 sec, respectively, and dried. The coated paper had gained almost 35% weight when compared with the untreated paper. The coated paper was tested with open flame to study flame spread. When the central part of the treated paper was brought into contact with open flame, the part in contact charred, but when the flame was moved away, the paper stopped burning and there was no propagation of the flame. Thus, the treated paper showed all indication of zero flame spread characteristics, compared to untreated paper, which burnt easily and sustained propagation of a flame.

Example 7

Composite Manufacturing without Cellulosic Material Pretreatment 100 grams of untreated air dried wood strands were soaked in 250 g of diluted $MgOH_2$-brine solution (50 g of $MgOH_2$-brine solution with 200 g of water). The temperature of the mixture was raised to 100° F. and maintained at that temperature for about one hour. The mixture was allowed to cool to 75° F. over a period of about 20 min. 175 grams of 23 wt. % saturated solution of mono potassium phosphate was stirred into the mixture and the exothermic acid-base reaction raised the temperature of the mixture by ~7-10 degrees ° F. The soaked fibers were then press molded into 4"×4" parts for testing.

During mixing of the fibers with brine, there was a strong smell of the extractives of the wood and color of the wood strands changed significantly from light brown to dark brown. During pressing, water was squeezed out from fibers wetted with acid/alkali components. Thus, the color change of the wood strands suggested that chemical reaction occurred between the wood and brine, with at least some hemicellulose and lignin was removed during the mixing and heating of wood strands. These observations demonstrated that pretreatment of cellulosic fiber in caustic solution can be eliminated and replaced with $Mg(OH)_2$-brine as used above to essentially remove wood extractives and/or part of the hemicelluloses. Thus, the methods described herein can significantly eliminate disposal issues related to the caustic solution used in commercial paper/wood processes. This further demonstrates that the inorganic/cellulosic material composite process disclosed and described herein can be more environmentally friendly than conventional cellulosic composite processes.

Example 8

Treatment of Wood Articles for Fire Retardancy

Two identical wood blocks, one as a control and the other for actual testing, were used. Both blocks were placed in oven at 212° F. to dry for about one hour. The control was then placed in water whereas the test sample was placed in diluted brine solution (300 g of brine+300 g of water). After soaking for two minutes, both blocks were dried at 212° F. in oven for about one hour. The control was then placed in the water bath again and the test sample was placed in saturated solution of mono potassium phosphate. After soaking for another two minutes, both blocks were dried in the oven at 212° F. for about one hour. There was no significant increase in the weight of the test sample after treatment, except it turned slightly white. Both the control and test samples were subjected to >1200° F. to test flame resistance. The controlled sample burned with a sustained flame, however, the treated sample failed to sustained a flame when the external flame was removed, charring only where the external flame made contact. Thus, the test sample prepared as described using the inorganic acidic/alkaline precursor components exhibited self extinguishing properties.

Example 9

Fabrication of Phosphate Bonded Paper

To demonstrate that it is possible to use phosphate based adhesives as binders for making paper products, the following four samples were prepared using hardwood market pulp. Thus, a first sample (Control) was prepared as follows: 100 grams of hardwood market pulp was mixed with 10 liters of water and then 500 grams of this mixture was further diluted in one kilogram water to produce very dilute paste. This diluted pulp suspension was passed through 70 mesh (212 micron) screen to retain a wet web of fiber. When dried, it had the appearance of paper.

A second sample was prepared as follows: 3.5 grams of $Mg(OH)_2$-brine and 15 grams of mono potassium phosphate solution were mixed with a diluted pulp solution as described above in the first test. Homogeneous paste was formed while stirring by hand. The mixed paste was passed through 70 mesh screen and formed into a web that when dried, had an appearance of paper similar to the control sample. Both the control paper sample and the second test paper sample were held directly on a flame. The control sample burned completely in about 3 seconds but the second test sample treated with phosphate $Mg(OH)_2$-brine did not char until about 20 seconds and did not sustain a flame even after the flame was removed. Thus, the second test sample, produce using inorganic acidic/alkaline $Mg(OH)_2$-brine precursor components, showed 6.5 times more flame resistance compared to control sample.

Figure 10:
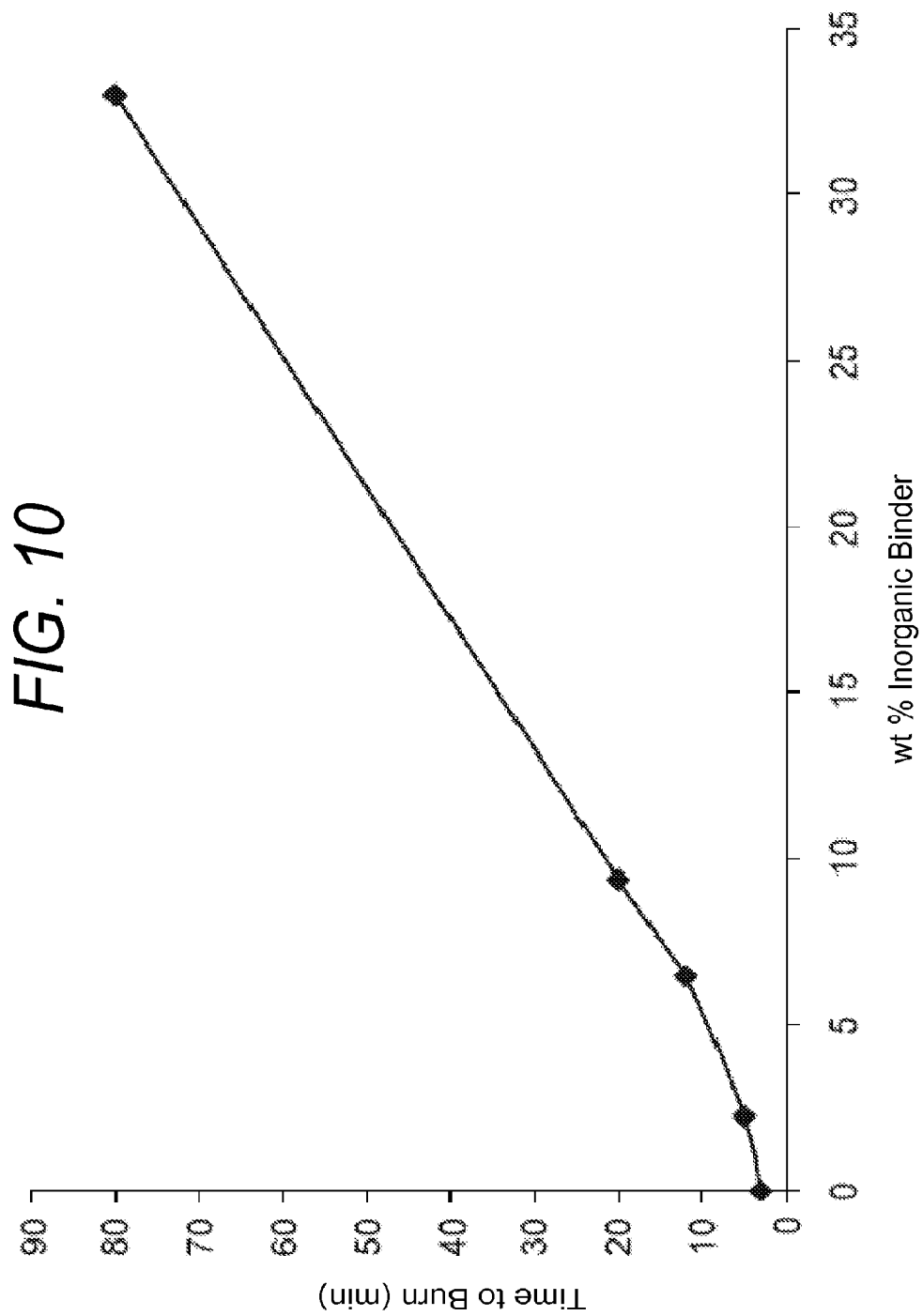
FIG. 10 graphically depicts the time to char an inorganic binder paper article as a function of the wt % inorganic binder as herein disclosed and described.

A third sample was prepared as follows: 10 wt. % brine solution (~6 g $Mg(OH)_2$ was mixed with diluted pulp suspension (~3 wt %) and spread that on a 70 mesh screen to form a wet web of fiber. 4 grams of 10 wt % concentrated mono potassium phosphate solution was sprayed on the wet web of fiber in the form of mist. On drying, the wet web formed a phosphate/$Mg(OH)_2$-brine bonded paper. Both brine and the mono potassium phosphate solution dispersed well and the sample had the appearance of the control sample of the first test. The dried product had a density between 0.7-0.9 g/cc depending upon the pressing pressure. The third sample was heated in an oven to 450° F. at a rate of 50° F./30 min showed about 23% mass loss. This is believed attributed to moisture associated with the formed composite. The mass loss was observed up to about 350° F. Above that temperature there was no observed decrease in weight. The third sample did not burn or char or lose physical integrity after the conclusion of the above experiment. Samples of paper fabricated with the instant inorganic binder having various wt % fiber were prepared in a manner similar to that described above and tested to determine the temperature at which the paper maintained a fame or caught fire. This data is shown in FIG. 10 and demonstrates that the amount of inorganic binder can be adjusted to provide a pre-determined end use fire-resistance temperature.

A fourth sample was prepared with disintegrated hardwood pulp mixed with a small amount of brine and mono potassium phosphate solution and formed into paper handsheets suitable for use in packaging products. In this experiment, the control was only disintegrated hardwood market pulp. The fourth sample provided superior flame resistance compared to the control when tested as described above.

Prophetic Example 10

Fire Retardant Inorganic Particle Board

A mixture of about 33 wt. % untreated saw dust, about 17 wt. % magnesium hydroxide brine in solution and about 50 wt. % magnesium dihydrogen phosphate $(Mg(H_2PO_4)_2.2H_2O)$ is combined. Water is added to the mixture and quickly mixed to soak the saw dust and dissolve the phosphate. The entire pulp is then pressed in a brick form in a mold at a pressure of 1000 psi. Excess water is squeezed out and acid-base chemical reaction occurred that should significantly heat the sample. Setting should occur within minutes to produce a hard brick form. This composite would provide for the production of non flammable products using saw dust or any other similar material combined with the presently disclosed inorganic acidic/alkaline adhesives.

The above description discloses several methods, compositions and materials. These descriptions are susceptible to modifications in the methods and materials, as well as alterations in the fabrication methods and equipment. Such modifications will become apparent to those skilled in the art from a consideration of this disclosure or practice of the disclosure. Consequently, it is not intended that this disclosure be limited to the specific embodiments disclosed herein, but that it cover all modifications and alternatives coming within the true scope and spirit of the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The invention claimed is:

1. A method of producing a composite product, the method comprising
    providing an organic material, and
    contacting the organic material with an inorganic adhesive, the inorganic adhesive comprising a mixture of an inorganic acidic precursor and an alkaline precursor, the inorganic acidic precursor comprising at least one of a saturated solution of phosphoric acid, sodium dihydrogen phosphate ($NaH_2PO_4$), potassium dihydrogen phosphate ($KH_2PO_4$), cesium dihydrogen phosphate ($CsH_2PO_4$), magnesium dihydrogen phosphate ($Mg(H_2PO_4)_2.2H_2O$), calcium dihydrogen phosphate ($Ca(H_2PO_4)_2.2H_2O$), zinc dihydrogen phosphate ($Zn$ ($H_2PO_4)_2$), mono aluminum hydro phosphate ($AlH_3(PO_4)_2 \cdot H_2O$), $MgCl_2$, $MgSO_4$, and mixtures thereof wherein the inorganic acidic precursor and the alkaline precursor are each mixed separately with the organic material, to form, independently, separate acidic fiber pulp or fiber, and separate alkaline pulp or fiber.

2. The method of claim 1, wherein the weight ratio of the organic material to the total inorganic adhesive, excluding water content, is less than about 40 weight percent organic material providing a fiber-reinforced ceramic composite product; or is more than 40 weight percent organic material providing an inorganic fiber composite product.

3. The method of claim 1, wherein the organic material comprises at least one of wood veneer, short and long flakes, long fiber, short fiber, strands, saw dust, wood particles, fiber bundles, stone groundwood (SGW), pressure groundwood (PSW), refiner mechanical pulp (RMP), thermomechanical pulp (TMP), chemithermomechanical pulp (CTMP), kraft pulp, sulfite pulp, soda pulp, bleached pulp, seed fibers, leaf fibers, bast fibers, fruit fibers, stalk fibers, silk, wool, spider silk, and mixtures thereof.

4. The method of claim 1, wherein the inorganic acidic precursor and the alkaline precursor are, independently, in solution, suspension, gel, or as paste.

5. The method of claim 1, wherein the alkaline precursor is present in solution.

6. The method of claim 1, wherein the contacting step comprises:
 (i) contacting the organic material with the alkaline precursor solution first, and then is contacted with the inorganic acidic precursor solution; or
 (ii) contacting the organic material with the inorganic acidic precursor followed by contact with the alkaline precursor; or
 (iii) contacting the organic material with the inorganic adhesive.

7. The method of claim 1, further comprising combining the separate acidic pulps or fibers and separate alkaline pulps or fibers, mixing with a sufficient amount of water; and forming a solid composite product therefrom.

8. The method of claim 1, further comprising drying the separate acidic pulps or fibers and separate alkaline pulps or fibers, combining the dried separate acidic pulps or fibers and separate alkaline pulps or fibers, then mixing the combined dried acidic pulps or fibers and alkaline pulps or fibers with water; and forming a solid composite product.

9. The method of claim 1, wherein the inorganic acidic precursor comprises at least one of an acid-phosphate, an alkaline earth chloride, or an alkaline earth sulfate.

10. The method of claim 1, wherein the alkaline precursor component comprises at least one of an oxide, hydroxide, or an oxide mineral.

11. The method of claim 1, wherein the alkaline precursor comprises a saturated solution or a paste of at least one of a monovalent- divalent-, or trivalent metal oxide or hydroxide of magnesium, calcium, iron, manganese, zinc, barium, strontium, aluminum, lanthanide, and mixtures thereof.

12. The method of claim 1, wherein the alkaline precursor is a solution of metal hydroxide rich brine.

13. The method of claim 12, wherein the metal hydroxide rich brine is magnesium hydroxide brine solution or pregnant Bayer liquor of aluminum hydroxide.

14. The method of claim 1, further comprising the addition of at least one of sodium hydroxide (NaOH), potassium hydroxide (KOH), ammonium hydroxide ($NH_4OH$), and calcium hydroxide ($Ca(OH)_2$) in an amount sufficient to raise the aqueous pH of the alkaline precursor.

15. The method of claim 14, wherein the aqueous pH of the alkaline precursor is between about 8 to about 14, preferably between about 9 to about 12, and most preferably between about 10 to about 11.

16. The method of claim 1, further comprising adjusting the solution pH of the inorganic acidic precursor to between about 3 to about 4.5.

17. The method of claim 1, wherein the pH is reduced by adding hydrophosphates.

18. The method of claim 1, further comprises adding at least one of calcium silicate, mullite, talc, oxide minerals, fly ash, bottom ash, Bayer process waste, acidic waste streams generated during extraction of copper from copper ore, or waste streams containing silicate and aluminate minerals, and mixtures thereof.

19. The method of claim 1, wherein the inorganic acidic precursor is magnesium chloride or magnesium sulfate solution, and the alkaline component is magnesium oxide.

20. The method of claim 1, further comprising heating at least one of the inorganic acidic precursor or alkaline precursor component to temperature less than about the boiling point of water prior to contacting with the the organic material.

21. The method of claim 1, wherein the inorganic acidic precursor is aluminum hydrophosphate and the alkaline precursor is aluminum oxide ($Al_2O_3$) or aluminum hydroxide ($Al(OH)_3$).

22. The method of claim 21, wherein the aluminum hydrophosphate and the alkaline precursor are mixed to form a paste that is then mixed with the organic material, and then heating the paste mixed with the organic material to about 400° F. for a time sufficient to form a composite article.

23. The method of claim 1, further comprising compressing the organic material contacted with the inorganic adhesive and/or applying vacuum and/or sonication.

24. The method of claim 23, further comprising withholding a portion of the inorganic adhesive prior to compressing and then adding the remaining portion of the inorganic adhesive at a time approximate to the end of compressing.

25. The method of claim 1, wherein the weight ratio of the inorganic acidic precursor and alkaline precursor is between about 8:1 to about 1:3.5.

26. The method of claim 2, wherein the inorganic phosphate adhesive comprises a mixture of:
 (i) an inorganic acidic precursor of at least one of a saturated solution of phosphoric acid, sodium dihydrogen phosphate ($NaH_2PO_4$), potassium dihydrogen phosphate ($KH_2PO_4$), cesium dihydrogen phosphate ($CsH_2PO_4$), magnesium dihydrogen phosphate ($Mg(H_2PO_4)_2 \cdot 2H_2O$), calcium dihydrogen phosphate ($Ca(H_2PO_4)_2 \cdot 2H_2O$), zinc dihydrogen phosphate ($Zn(H_2PO_4)_2$), mono aluminum hydro phosphate ($AlH_3(PO_4)_2 \cdot H_2O$), $MgCl_2$, $MgSO_4$, and mixtures thereof; and
 (ii) an alkaline precursor of at least one of a monovalent- divalent-, or trivalent metal oxide or hydroxide of magnesium, calcium, iron, manganese, zinc, barium, strontium, aluminum, lanthanide, and mixtures thereof, wherein the alkaline precursor is in solution; and
 the organic material is less than about 40 wt. % cellulosic material;
 wherein a fiber reinforced composite product is produced.

27. The method of claim 26, wherein the cellulosic material comprises at least one of wood veneer, short and long flakes, strands, saw dust, wood particles, fiber bundles, and/or products obtained by pulping, stone groundwood (SGW), pressure groundwood (PSW), refiner mechanical pulp (RMP), thermomechanical pulp (TMP), chemithermomechanical pulp (CTMP), kraft pulp, sulfite pulp, soda pulp, bleached pulp, seed fibers, leaf fibers, bast fibers, fruit fibers, stalk fibers, and mixtures thereof.

28. The method of claim 26, wherein: (i) contacting the cellulosic material with the alkaline precursor solution first, and then contacting with the inorganic acidic precursor; or (ii) contacting the cellulosic material with the inorganic acidic precursor followed by contacting the alkaline precursor solution; or (iii) contacting the cellulosic material with the inorganic adhesive.

29. The method of claim 26, wherein the inorganic adhesive is least one of a phosphate ceramic, an oxychloride ceramic, an oxysulfate ceramic, and mixture thereof.

30. The method of claim 26, further comprises adding at least one of calcium silicate, olivine, mullite, talc, oxide minerals, fly ash, bottom ash, Bayer process waste, acidic waste streams generated during extraction of copper from copper ore, or waste streams containing silicate and aluminate minerals, and mixtures thereof.

31. The method of claim 26, further comprising injection molding or extruding the inorganic adhesive and the cellulosic material.

32. The method of a claim 26, further comprising applying vacuum and/or sonication.

33. The method of claim 26, further comprising heating at least one of the inorganic acidic precursor or alkaline precursor component to temperature less than the boiling point of water prior to contacting with the cellulosic material.

34. The method of claim 26, wherein the fiber reinforced composite provides fire resistance, zero flame spread, minimum release of green house gases, no release of volatile organic compounds, and low water absorption.

35. A composite article produced from claim 1.

36. A composite article produced from claim 30.

37. A method of producing non-flammable blowable insulation, the method comprising
providing a blowable material comprising at least one of shredded paper, saw dust, wood shavings, shredded plastics, glass particles or glass fibers; gypsum, expandable clays, or mixtures thereof;
providing an inorganic adhesive, the inorganic adhesive comprising:
(i) an inorganic acidic component comprising at least one of a saturated solution of phosphoric acid, sodium dihydrogen phosphate ($NaH_2PO_4$), potassium dihydrogen phosphate ($KH_2PO_4$), cesium dihydrogen phosphate ($CsH_2PO_4$), magnesium dihydrogen phosphate ($Mg(H_2PO_4)_2.2H_2O$), calcium dihydrogen phosphate ($Ca(H_2PO_4)_2.2H_2O$), zinc dihydrogen phosphate ($Zn(H_2PO_4)_2$), $MgCl_2$, $MgSO_4$, mono aluminum hydrophosphate ($AlH_3(PO_4)_2.H_2O$), and mixtures thereof; and
(ii) an alkaline precursor comprising a saturated solution or a paste of at least one of a monovalent-, divalent-, or trivalent-metal oxide or hydroxide of magnesium, calcium, iron, manganese, zinc, barium, strontium, aluminum or lanthanide, and mixtures thereof;
contacting the material with the inorganic adhesive for a sufficient time to bond the inorganic adhesive with the blowable material; and
providing a non-flammable, blowable insulation.

38. A method of producing fire resistant paper and paper products, the method comprising
providing a cellulosic material;
providing an inorganic adhesive comprising as components:
(i) an inorganic phosphate solution comprising at least one of a saturated solution of phosphoric acid, or an acid phosphate salt comprising sodium dihydrogen phosphate ($NaH_2PO_4$), potassium dihydrogen phosphate ($KH_2PO_4$), cesium dihydrogen phosphate ($CsH_2PO_4$), magnesium dihydrogen phosphate ($Mg(H_2PO_4)_2.2H_2O$), calcium dihydrogen phosphate ($Ca(H_2PO_4)_2.2H_2O$), zinc dihydrogen phosphate ($Zn(H_2PO_4)_2$), $MgCl_2$, $MgSO_4$, mono aluminum hydrophosphate ($AlH_3(PO_4)_2.H_2O$), and mixtures thereof; and
(ii) an alkaline precursor solution comprising at least one of a saturated solution or a paste of at least one of a monovalent-divalent-, or trivalent metal oxide or hydroxide of magnesium, calcium, iron, manganese, zinc, barium, strontium, aluminum or lanthanide, and mixtures thereof;
combining the cellulosic material and the inorganic adhesive; and
forming a paste comprising the cellulosic material and the inorganic adhesive suitable for paper forming.

39. The method of claim 38, wherein the dry weight ratio of cellulosic material to inorganic adhesive is between about 1 wt. % to about 20 wt. %.

40. The method of claim 38, wherein the inorganic adhesive further comprises at least one of calcium silicate, olivine, mullite, talc, oxide minerals, fly ash, bottom ash, waste streams containing silicate and aluminate minerals, and mixtures thereof.

41. A flame resistant paper or flame resistant paper article produced by the method of claim 38.

42. A nonflammable home and commercial building wrap or wall paper produced by the method of claim 38.

* * * * *